United States Patent
Krishnamurthy et al.

(10) Patent No.: US 11,301,761 B2
(45) Date of Patent: *Apr. 12, 2022

(54) BEHAVIORAL PREDICTION FOR TARGETED END USERS

(71) Applicant: Adobe Inc., San Jose, CA (US)

(72) Inventors: Balaji Krishnamurthy, Noida (IN); Tushar Singla, New Delhi (IN)

(73) Assignee: Adobe Inc., San Jose, CA (US)

( * ) Notice: Subject to any disclaimer, the term of this patent is extended or adjusted under 35 U.S.C. 154(b) by 710 days.

This patent is subject to a terminal disclaimer.

(21) Appl. No.: 16/241,456

(22) Filed: Jan. 7, 2019

(65) Prior Publication Data

US 2019/0138917 A1    May 9, 2019

Related U.S. Application Data

(63) Continuation of application No. 14/828,150, filed on Aug. 17, 2015, now Pat. No. 10,210,453.

(51) Int. Cl.
*G06N 5/02* (2006.01)
*G06Q 30/02* (2012.01)
(Continued)

(52) U.S. Cl.
CPC ......... *G06N 5/022* (2013.01); *G06F 16/9024* (2019.01); *G06F 16/9535* (2019.01);
(Continued)

(58) Field of Classification Search
CPC .......... G06N 5/022; G06N 5/025; G06N 5/04; G06N 7/005; G06N 99/005; G06N 20/00;
(Continued)

(56) References Cited

U.S. PATENT DOCUMENTS

| | | |
|---|---|---|
| 10,210,453 B2 | 2/2019 | Krishnamurthy et al. |
| 2009/0198553 A1* | 8/2009 | Selinger ................. G06Q 30/02 705/14.52 |

(Continued)

OTHER PUBLICATIONS

"First Action Interview Office Action", U.S. Appl. No. 14/828,150, dated Aug. 28, 2018, 4 pages.

(Continued)

*Primary Examiner* — Dave Misir
(74) *Attorney, Agent, or Firm* — FIG. 1 Patents

(57) ABSTRACT

Behavioral prediction for targeted end users is described. In one or more example embodiments, a computer-readable storage medium has multiple instructions that cause one or more processors to perform multiple operations. Targeted selectstream data is obtained from one or more indications of data object requests corresponding to a targeted end user. A targeted directed graph is constructed based on the targeted selectstream data. A targeted graph feature vector is computed based on one or more invariant features associated with the targeted directed graph. A behavioral prediction is produced for the targeted end user by applying a prediction model to the targeted graph feature vector. In one or more example embodiments, the prediction model is generated based on multiple graph feature vectors respectively corresponding to multiple end users. In one or more example embodiments, a tailored opportunity is determined responsive to the behavioral prediction and issued to the targeted end user.

20 Claims, 12 Drawing Sheets

(51) Int. Cl.
 G06F 16/901 (2019.01)
 G06F 16/9535 (2019.01)
 G06Q 30/00 (2012.01)
 G06N 20/00 (2019.01)
(52) U.S. Cl.
 CPC ......... *G06Q 30/00* (2013.01); *G06Q 30/0241* (2013.01); *G06N 20/00* (2019.01)
(58) Field of Classification Search
 CPC ......... G06F 17/30867; G06F 17/30958; G06F 16/9535; G06F 16/9024; G06Q 30/0241; G06Q 30/02; G06Q 30/00
 USPC .......................................................... 706/11
 See application file for complete search history.

(56) References Cited

U.S. PATENT DOCUMENTS

| | | | | |
|---|---|---|---|---|
| 2009/0199233 | A1* | 8/2009 | Selinger | G06Q 30/02 725/34 |
| 2012/0246098 | A1* | 9/2012 | Chari | G06N 20/00 706/12 |
| 2012/0311139 | A1* | 12/2012 | Brave | G06F 16/9535 709/224 |
| 2012/0323558 | A1* | 12/2012 | Nolan | G06F 40/211 704/9 |
| 2013/0198007 | A1* | 8/2013 | Selinger | G06Q 30/02 705/14.66 |
| 2015/0088911 | A1* | 3/2015 | Qiao | H04L 67/22 707/749 |
| 2015/0199613 | A1* | 7/2015 | Ruiz | G06N 3/08 706/11 |
| 2015/0220999 | A1* | 8/2015 | Thornton | H04M 15/8011 705/14.66 |
| 2016/0342705 | A1* | 11/2016 | Zheng | G06F 16/958 |
| 2016/0342899 | A1* | 11/2016 | Kabiljo | G06N 20/00 |
| 2017/0053208 | A1 | 2/2017 | Krishnamurthy et al. | |

OTHER PUBLICATIONS

"Notice of Allowance", U.S. Appl. No. 14/828,150, dated Oct. 23, 2018, 8 pages.

"Pre-interview First Office Action", U.S. Appl. No. 14/828,150, dated Jun. 19, 2018, 4 pages.

Basak, "Determining Structural Similarity of Chemicals Using Graph-Theoretic Indices", Department of Chemistry, University of Minnesota, Duluth, USA, 1988, pp. 17-44.

Rucker, "Exploring the Limits of Graph Invariant and Spectrum Based Discrimination of (Sub)structures", Department of Mathematics, Universität Bayreuth, Bayreuth, Germany J. Chem. Inf. Comp. Sci. 42, 2002, pp. 640-650.

* cited by examiner

BEHAVIORAL PREDICTION FOR TARGETED END USERS

RELATED APPLICATION

This application is a continuation of and claims priority to U.S. patent application Ser. No. 14/828,150 filed Aug. 17, 2015 entitled "Behavioral Prediction for Targeted End Users," the disclosure of which is incorporated by reference herein in its entirety.

BACKGROUND

Sites on the World Wide Web (WWW) provide services to people using browsers and other applications on their devices, such as personal computers, smart phones, and tablets. Services that are provided include news, social communication, ecommerce, general knowledge, retail sales, and so forth. To utilize a service, a person uses an electronic device to make a request to a website for some item of information. The website returns the requested information item to the electronic device of the person.

In an example ecommerce scenario, a person requests information about a product, such as a blender, from a retail website. The retail website sends information about the blender back to the requesting device of the person. The information may include images, specifications, reviews, and a cost for the blender. If the person does not decide to purchase the blender, the person leaves the retail website. In such a case, the retail website loses a sale.

In an example news scenario, a person requests information about a news event, such as flooding, from a news website. The news website serves a webpage about the flooding event to the requesting device of the person. The webpage may include a slideshow and text descriptive of the extent and repercussions of the flooding. If the person does not request another webpage from the news website, the news website loses the opportunity to continue engaging with, and presenting advertisements to, the person.

Companies would prefer to retain the interest of people visiting their websites to make sales and to continue to serve advertisements. But if a person's needs or wants are not being met by a website, the person will abandon the website and possibly switch to a competitor's website.

SUMMARY

Behavioral prediction for targeted end users is described. In one or more example embodiments, a device is implemented at least partially in hardware and includes a behavioral prediction engine to predict targeted end user behavior to facilitate opportunity tailoring. The behavioral prediction engine is capable of creating a prediction model using multiple modules. The multiple modules include a selectstream data obtainment module, a directed graph construction module, a graph feature vector computation module, and a prediction model generation module. The selectstream data obtainment module is implemented to obtain from a storage device selectstream data corresponding to multiple end users. The selectstream data may include information indicative of multiple data objects selected for access by an end user as the end user traverses across or over multiple data objects. An end user traversing over a website, for example, can create so-called clickstream data. The directed graph construction module is implemented to construct multiple directed graphs, with each respective directed graph being constructed based on the selectstream data corresponding to a respective end user of the multiple end users. Each directed graph is associated with one or more invariant features, which may be selected from among those aspects of a graph that do not vary between two isomorphic graphs, such as a number of vertices. The graph feature vector computation module is implemented to compute multiple graph feature vectors, with each respective graph feature vector being computed based on the one or more invariant features associated with a respective directed graph of the multiple directed graphs. The prediction model generation module is implemented to generate a prediction model based on the multiple graph feature vectors using a machine learning system. The prediction model is capable of producing a behavioral prediction responsive to targeted selectstream data that corresponds to a targeted end user.

In one or more example embodiments, a device includes one or more processors that are implemented to perform a number of operations to use the prediction model. Targeted selectstream data is obtained from one or more indications of data object requests corresponding to a targeted end user. A targeted directed graph is constructed based on the targeted selectstream data. A targeted graph feature vector is computed based on one or more invariant features associated with the targeted directed graph. A behavioral prediction is produced for the targeted end user by applying the prediction model to the targeted graph feature vector. The behavioral prediction may be used to issue a tailored opportunity for the targeted end user so as to increase or decrease a likelihood of the predicted behavior occurring.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the discussion.

DETAILED DESCRIPTION

Overview

Figure 1:
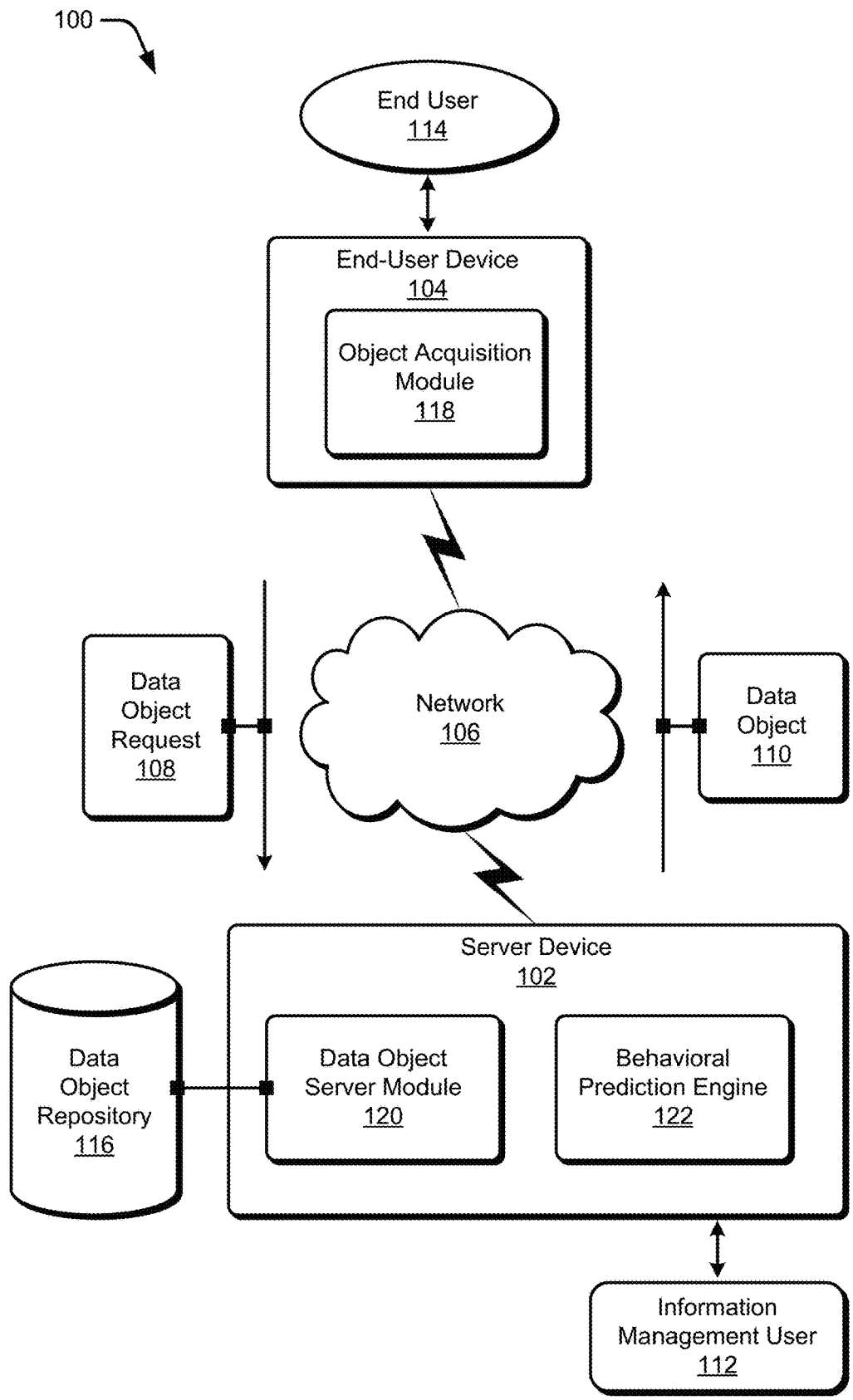
FIG. 1 illustrates an environment for example embodiments that are operable to employ techniques described herein that relate to behavioral prediction for targeted end users.

As discussed above, companies would prefer to retain the interest of people visiting their websites. A website is more likely to entice a person into completing a purchase or clicking another link to continue engagement with the website if a person's needs or wants are being met by the website. In an e-commerce scenario, for example, a person's interest may be converted into a sale if the ideal product is surfaced for the person's consideration or if a discount is offered to the person. The challenge is trying to determine what offer or other opportunity will appeal to a person interacting with a website.

One approach to determine what a website user will find appealing is to employ a machine learning algorithm Machine learning algorithms operate using input features to produce an output recommendation. The features used in machine learning algorithms that are applied to clickstream data for an ecommerce platform have conventionally been based on occurrences of events on the website, general user traits, and features based on timestamps (i.e., time-based features). Event variables include an addition of an item to a cart, a purchase of a good, a type of good purchased, and so forth. General user traits include browser information, a geographic location, and so forth. Examples of time-based features include a timestamp, a time of day, a month, a season, an upcoming holiday, and so forth. These features reflect intrinsic, isolated, singular, or other static characteristics of a website visitor.

From a sales perspective, marketers would like to know which users are similar in behavior, which may be ascertained by clustering. From a data science perspective, distributions of visitors may be investigated across different clusters and audience subsets. Models can be developed to predict the behavior of a new visitor by classifying the new visitor as similar in behavior to a pre-existing group of visitors. The new visitor's properties or behavior can be inferred from the known properties or behaviors of the pre-existing group. This enables a marketer to gain insights about a new visitor and potential customer, perform operations for targeted advertising, and thereby lift revenue.

If the features obtained for the pre-existing group of visitors are significant, such features can be used for the purpose of behavioral targeting. For a clustering example, if there is a high concentration of visitors that exhibited a particular behavior in a given cluster, then new visitors belonging to the same given cluster may be labelled as having a propensity to exhibit the same particular behavior. In other words, a new visitor can be tested for membership in a cluster and assigned the corresponding behavior of the cluster if the new visitor qualifies for membership in the cluster. For a classification example, a classification model can be developed to classify new visitors into one of a number of distinct classes that correspond to different behavioral traits. The classification model can be trained with a pre-classified training set from a group of pre-existing visitors and then used to infer how a new visitor would be classified.

Feature engineering is an ongoing endeavour to find better or more relevant features that capture pertinent information about the underlying entities. For website visitor analysis, features are expected to capture information pertinent to discriminability between and amongst user behavior. Conventional variables that are used for the creation of features are unable to completely capture the behavior of a visitor. For example, the dynamics of visitor interaction on a website as the visitor traverses over different webpages of the website over a period of time is not reflected in conventional features. For instance, conventional features fail to convey information about whether a visitor tends to cycle or re-visit webpages.

An approach using conventional variables may be implemented in an attempt to approximate dynamic visitor behavior by creating additional variables that measure some specific properties, such as to indicate 'is a returning visitor' or 'has browsed a particular section previously.' However, such an approach is approximate and ad-hoc in nature; consequently, clustering or classifying visitors based on these additional conventional variables is error prone. As is introduced herein below, a traversal by a visitor over different webpages of a website may be considered a type of visitor interaction with the website. Further, it is asserted herein that this type of visitor interaction may be analyzed to predict visitor behavior. However, a similarity between two traversals of two different visitors cannot be modelled using conventional features because conventional features are static-oriented and do not contain information about a visitor's evolving behavior as the visitor interacts with the website.

In contrast with the static-oriented analysis discussed above, dynamic behavior of an end user may be analyzed to more finely tune marketing efforts. For certain example embodiments as described herein, behavioral features are created that take into account dynamic interactions of end users. More specifically, features are created that reflect a path of travel of an end user over individual data objects of a collection of data objects. For instance, a transition from one data object to another data object may be incorporated into a directed graph as a directed edge. Data objects may include, for example, webpages accessed via a web browser or product descriptions accessed via a mobile retail app. In example WWW implementations, data objects of a collection of data objects may therefore include webpages of a web site, and a transition from one data object to another data object may include clicking on a link that takes a web browser from one webpage to another webpage.

In one or more example embodiments, a prediction model is created based on dynamic user behavior. An end user requests a data object that links to another data object of a collection of data objects. Additional requests are made as the end user traverses over multiple data objects. For example, an end user may visit multiple webpages of a website. Indications of the selected data objects, which are requested by traversing links between the data objects, are obtained and accumulated as selectstream data. The selectstream data is used to construct a directed graph having at least one invariant feature. An invariant feature may be selected from among those aspects of a graph that do not vary between two isomorphic graphs, such as a number of edges or a length of the shortest path from a start node to an end node. A graph feature vector is computed based on the at least one invariant feature of the directed graph. Multiple respective graph feature vectors are thus computed based on dynamic traversals between data objects for multiple respective end users. A prediction model is generated based on the multiple graph feature vectors using a machine learning system.

In one or more example embodiments, a prediction model is used to create a behavioral prediction for an end user that is being targeted for marketing analysis. First, targeted selectstream data is obtained from one or more indications of data object requests that correspond to a targeted end user. Second, a targeted directed graph is constructed based on the targeted selectstream data. Third, a targeted graph feature vector is computed based on one or more invariant features associated with the targeted directed graph. Fourth, a behavioral prediction is produced for the targeted end user by applying a prediction model to the targeted graph feature vector. For one or more example embodiments, a tailored opportunity is determined responsive to the behavioral prediction and is issued to the targeted end user.

In these manners, dynamic behavior of an end user may be captured in a vector of features computed from invariant graph features. A directed graph may capture natural information about an end user's activities (e.g., cycles and repeating visits) as well as more latent information that is otherwise difficult to acquire about an end user's interactive activities (e.g., the Eigen values of a graph that reflect a "density of connections" in a visitor's website browsing). Information from a directed graph that is derived based on an end users' dynamic interactions can be pertinent to machine learning tasks that lead to accurate targeted marketing.

To gather data to implement a machine learning scheme, selectstream data may be accumulated as an end user traverses over multiple data objects. Using the transitions between pairs of traversed data objects as directed edges of graph, a directed graph may be constructed that captures dynamic aspects of end user behavior. The dynamic aspects of the behaviors of previous end users that are incorporated into directed graphs may be utilized to predict the future behavior of a targeted end user more accurately or in different ways as compared to relying on merely static aspects of end users. For instance, an interesting webpage article may be surfaced for an end user that is perusing a website in order to provide additional advertising to the end user, or a discount may be offered to an end user that is shopping to secure a sale for an electronic retailer.

In a conventional scenario, an end user that is shopping electronically via a browser or a dedicated app of a retailer may look for a desired item without ever finding it. This shopping end user may conduct searches, repeatedly make requests for information on items, and eventually start to traverse multiple webpages of a website in a circular fashion, without finding the desired item. By comparing the dynamic behavior of the shopping end user as webpages are traversed to the dynamic behavior of previous end users that ultimately found and purchased an item, an item that is likely to be desired by the shopping end user may be suggested to the shopping end user by the electronic retailer. In an alternative situation, the dynamic behavior of the shopping end user may be similar to the dynamic behaviors of end users that tended to abandon the website without making a purchase, at least absent a financial incentive. In this situation, the electronic retailer may increase the likelihood of securing a sale by offering the shopping end user a coupon for free shipping or a percentage discount to make a purchase.

In the following discussion, after some example terminology is set forth, an example environment is described that may employ the techniques described herein. Example embodiment systems and machines and example embodiment procedures and processes are then described that may be performed in the example environment as well as in other environments. Consequently, performance of the example procedures is not limited to the example environment, and the example environment and systems are not limited to performance of the example procedures.

Terminology Examples

In one or more example embodiments, the term "data object," as used herein, refers to an item or piece of digital information. Examples of a data object may include, but are not limited to, a web page or other network-accessible content that is identifiable by a uniform resource locator (URL), an article, a file retrievable via the internet, an image, a video, a product, a description of a product, reviews on a product, a series of product pictures, a social media post that is actively selected, or some combination thereof. A data object may be retrieved using a web browser or another application via a network, such as the internet. A data object may also be loaded from memory that is associated with an application, such as if an application is preloaded with different items of information.

In one or more example embodiments, the term "end user," as used herein, refers to a person or other entity that traverses from one data object to another data object over some period of time and exhibits some kind of behavior. Analysis of the dynamic behavior of multiple end users may be employed to predict the behavior of a targeted end user. In one or more example embodiments, the term "targeted end user," as used herein, refers to an end user whose behavior is to be predicted. The term "targeted" may be applied to aspects of behavioral prediction that are specifically associated with a targeted end user.

In one or more example embodiments, the term "behavioral attribute," as used herein, refers to a categorization or label or description of a behavior exhibited by an end user. Examples of a behavioral attribute may include, but are not limited to, made a purchase, left a website, performed a product comparison, investigated a suggested product further, purchased after a discount was offered, signed up to receive emails, abandoned a cart, selected a particular product from among several product options, returned to a website after a delay, or some combination thereof.

In one or more example embodiments, the term "behavioral prediction," as used herein, refers to an action that is forecasted to be taken by a targeted end user. An action may be forecasted if the likelihood of the action occurring reaches a certain level, such as a probability of occurrence is calculated at greater than 50%. Examples of a behavioral prediction may include, but are not limited to, make a purchase, leave a web site, perform a product comparison, investigate a suggested product further, purchase if a discount is offered, sign up to receive emails, abandon a cart, select a particular product from among several product options, return to a website after a delay, or some combination thereof.

In one or more example embodiments, the term "selectstream data," as used herein, refers to data indicative of multiple data objects selected for access by an end user as the end user traverses across or over the multiple data objects. Examples of selectstream data may include, but are not limited to, a temporally-ordered series of data objects, a chronological listing of identifiers of selected data objects, a data structure having multiple entries indicating a current data object and a previous data object, pairs of source data objects and destination data objects—such as if one data object links to another data object, a string of data object identifiers, or some combination thereof. In a World Wide Web (WWW) environment with end-user interaction based on selecting links of web pages via a web browser, selectstream data may include so-called clickstream data. By way of example, "targeted selectstream data" may be obtained from one or more indications of data objects requested by a targeted end user.

In one or more example embodiments, the term "directed graph," as used herein, refers to a graph having multiple vertices and multiple directed edges that interconnect various vertices. Each directed edge starts at one vertex and ends at another vertex. A data object may be assigned to a vertex. A directed edge may be defined to represent a dynamic transition by an end user from a source data object to a destination data object. For instance, a current web page may correspond to a source data object and may include a link to another web page, and the other web page may correspond to a destination data object if an end user clicks on the link.

In one or more example embodiments, the term "invariant feature," as used herein, refers to an aspect of a graph that does not vary for two isomorphic graphs. Examples of invariant features may include, but are not limited to, a number of vertices, a number of edges, vertex connectivity, the longest of the shortest path lengths between pairs of vertices, or some combination thereof. Additional examples of invariant features of a graph, including those that especially relate to an end user that traverses over data objects, are discussed below with particular reference to FIGS. 3 and 4.

In one or more example embodiments, the term "graph feature vector," as used herein, refers to a vector including multiple respective values computed for multiple respective invariant features of a directed graph. Two directed graphs that are isomorphic have the same set of invariant features; hence, corresponding graph feature vectors of the two isomorphic directed graphs are the same. In other words, the Euclidean distance between the two graph feature vectors of the two isomorphic directed graphs is zero. If two directed graphs are similar, then the corresponding graph feature vectors are close under the Euclidean distance. In one or more example embodiments, the term "measure of similarity," as used herein, refers to how close at least one graph feature vector is to one or more other graph feature vectors. Examples of similarity may include, but are not limited to, an L-p norm distance between them, a Euclidean distance between them, or some combination thereof. By way of example, a "targeted graph feature vector" may be computed from a "targeted directed graph," which may be constructed from "targeted selectstream data."

In one or more example embodiments, the term "prediction model," as used herein, refers to a mechanism in a digital environment that is implemented to produce a behavioral prediction from a targeted graph feature vector. A prediction model may be generated or operated with a machine learning system using multiple graph feature vectors corresponding to multiple end users, in conjunction with behavioral attributes that are associated with the multiple end users.

In one or more example embodiments, the term "machine learning system," as used herein, refers to an apparatus in a digital environment that is implemented to process multiple graph feature vectors corresponding to multiple end users, in conjunction with associated behavioral attributes. A machine learning system may be used to generate or operate a prediction model. Examples of implementation approaches for machine learning systems for unsupervised or supervised learning may include, but are not limited to, cluster analysis, association rule learning, classification, support vector machines (SVMs), Bayesian networks, regression, or some combination thereof.

In one or more example embodiments, the term "tailored opportunity," as used herein, refers to an opportunity that is presented to a targeted end user responsive to a behavioral prediction. Examples of an opportunity may include, but are not limited to, purchase a product with a discount, sign up for a customer associative program, further investigate one or more of several suggested products, chat with a live representative, or some combination thereof. An opportunity may be tailored to overcome or fulfill a behavioral prediction. A tailored opportunity may be presented to a targeted end-user in real-time, at a later moment, with a pop-up window, with a banner announcement, with an email, visually using a display, aurally using a speaker, or some combination thereof.

Also, unless context dictates otherwise, use herein of the word "or" may be considered use of an "inclusive or," or a term that permits inclusion or application of one or more items that are linked by the word "or" (e.g., a phrase "A or B" may be interpreted as permitting or being relevant to just "A," to just "B," or to both "A" and "B").

Example Environment

FIG. 1 is an illustration of an environment 100 for one or more example embodiments that are operable to employ techniques described herein that relate to behavioral prediction for targeted end users. As illustrated, the example environment 100 includes at least one server device 102, at least one end-user device 104, at least one network 106, at least one data object request 108, and at least one data object 110. The environment further includes at least one information management user 112, at least one end user 114, and at least one data object repository 116. The end-user device 104 may include at least one object acquisition module 118. The server device 102 may include at least one data object server module 120 and at least one behavioral prediction engine 122.

For one or more example embodiments, an end user 114 is associated with an end-user device 104, and an information management user 112 is associated with a server device 102. The end-user device 104 may be in communication with the server device 102, or vice versa, via at least one network 106. The network 106 may be implemented with at least a portion of one or more network types. Network types may include, but are not limited to, a public network, a private network, the internet, the WWW, an Ethernet, an intranet, an extranet, a wireless network, a wired network, a cellular network, an infrastructure network, an ad hoc network, a Bluetooth network, a Wi-Fi network, an LTE network, a PSTN, or some combination thereof.

An end-user device 104 may be implemented or realized as any suitable type of computing device. Examples of the end-user device 104 include, but are not limited to, a desktop computer, a laptop computer, a mobile device (e.g., assuming a handheld configuration such as a tablet, a mobile phone, or a phablet), a mobile device coupled to a separate screen, an entertainment appliance such as a smart television, a game console, a device that is capable of receiving gesture input, a device that is capable of receiving speech or video input, a device that is capable of providing 2D or 3D image output, a device that is capable of providing sound output, a wearable computing device such as a smart watch or intelligent glasses, or some combination thereof. Thus, the end-user device 104 may range from relatively high-resource devices with substantial memory and processor resources (e.g., personal computers or game consoles) to relatively low-resource devices with constrained memory or processing resources (e.g., mobile devices such as wearables).

For one or more example embodiments, the end user 114 may be a person or other entity that is obtaining the data objects 110 with the object acquisition module 118 of the end-user device 104 using the data object requests 108. In one example implementation, the object acquisition module 118 sends the data object request 108 to the data object server module 120 via the network 106 and receives the data object 110 in return. By way of example only, the object acquisition module 118 may be implemented as at least part of a web browser or another program that is capable of retrieving a web page or a file from a web server. Alternatively, in another example implementation, the object acquisition module 118 may be implemented as at least part of an application that retains at least part of a data object repository 116 locally at the end-user device 104. By way of example only, a retail company may provide an app that enables the end user 114 to shop for clothes with descriptive information for at least some of the clothes cached by or otherwise stored as part of the data for the application.

For one or more example embodiments, the data object server module 120 may be coupled to and have access to the data object repository 116. In response to receiving a data object request 108, the data object server module 120 access the data object repository 116, retrieves the requested data object 110 from the data object repository 116, and then transmits the data object 110 to the object acquisition module 118. A data object repository 116 may be realized as at least part of a local or distributed database or may be part of or separate from the server device 102. At least a portion of the data object repository 116 may be located or stored at any one or more of a number of different places. Example places of location or storage include, but are not limited to, the end-user device 104 (e.g., as part of or separate from the object acquisition module 118), the server device 102 (e.g., that is coupled to the data object server module 120, as shown, or that is coupled to the behavioral prediction engine 122), the network 106 (e.g., in an amalgamated form at one location or distributed across multiple network locations), or some combination thereof.

As shown, the data object server module 120 and the behavioral prediction engine 122 are executing on a same server device. Alternatively, the data object server module 120 and the behavioral prediction engine 122 may be executing on different servers. In either case, a same company or different companies may be operating the data object server module 120 and the behavioral prediction engine 122 on one or more server devices 102. The server device 102 may be implemented as, for example, a web server, a server running open source software, a server of a proprietary design, a stand-alone server, a server blade, an allocated portion of a server farm, server functionality distributed across at least one data center, some combination thereof, and so forth. Although a single server device 102 is explicitly shown in FIG. 1, a server device 102 may be representative of a plurality of different devices or distributed computing resources that interoperate or coordinate to perform operations "over the cloud" or "in the cloud" as is known.

Behavioral prediction for targeted end users may be provided by an information management user 112, which may be an individual, a company, or some other entity. For environment 100, the information management user 112 may be associated with the server device 102 or with the behavioral prediction engine 122 to facilitate an analysis of requested data objects 110, e.g., to facilitate an analysis of web traffic for a website. The information management user 112 may be associated with (e.g., own, lease, or manage) the server device 102 or cause the behavioral prediction engine 122 to be operated in accordance with the principles described herein.

For one or more example embodiments, a behavioral prediction engine 122 may be located at or executing on the server device 102. The behavioral prediction engine 122 represents functionality to implement techniques for behavioral prediction for targeted end users as described herein. The behavioral prediction engine 122 may be implemented as a software package that executes on and specially configures one or more processors; as a hardware apparatus; or using a combination of software, hardware, firmware, fixed logic circuitry; and so forth. In an example implementation, the behavioral prediction engine 122 analyzes data objects 110 that are requested by an end user 114 and that are stored in the data object repository 116. Hence, the behavioral prediction engine 122 may at least partially implement one or more techniques or systems as described herein for behavioral prediction for targeted end users.

Having considered an example environment, consider now a discussion of some example details of the systems or techniques for behavioral prediction for targeted end users in accordance with one or more embodiments.

Behavioral Prediction for Targeted End Users

Figure 2:
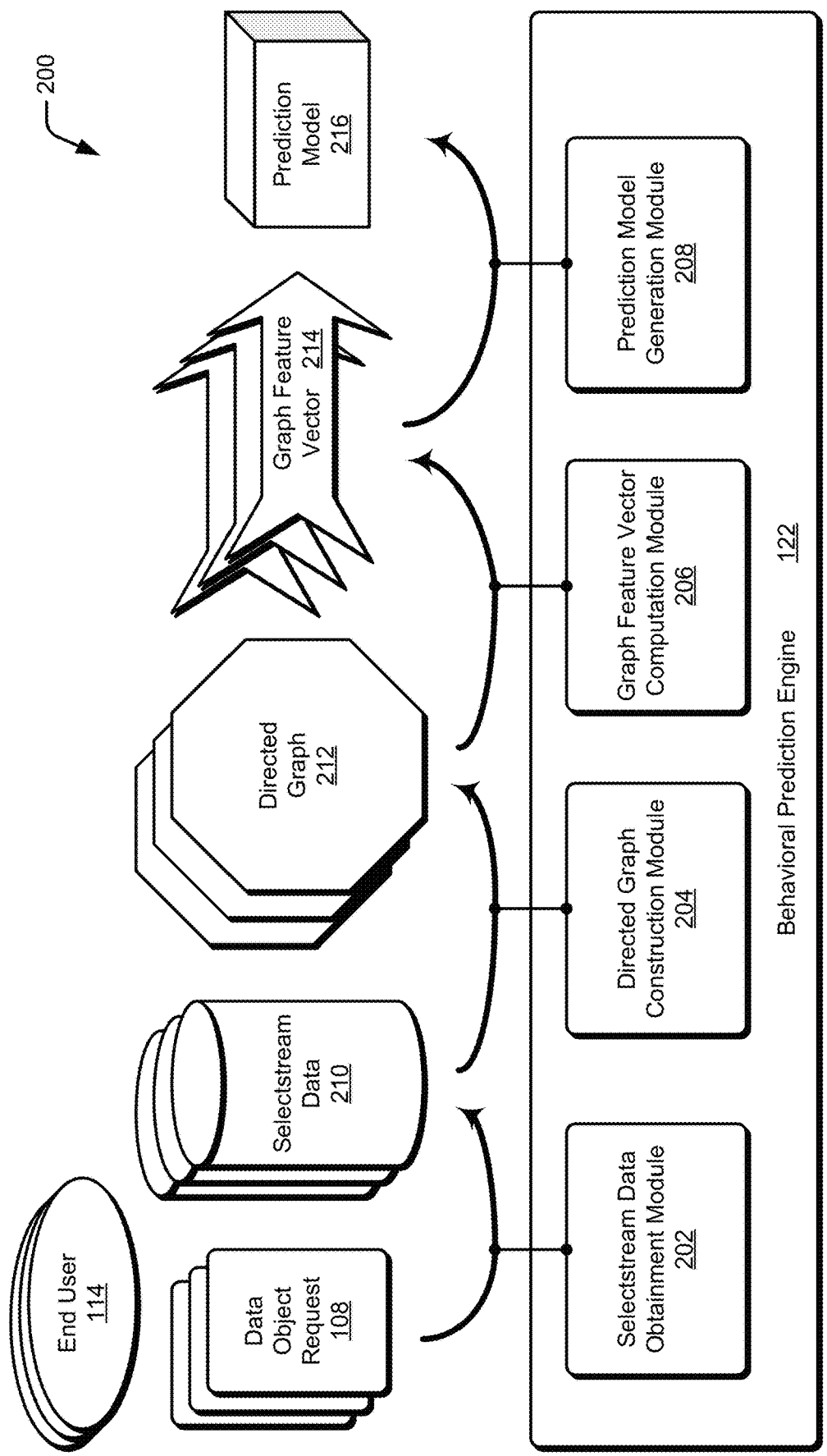
FIG. 2 illustrates an example behavioral prediction engine, which includes four modules, that operates to create a prediction model from selectstream data in accordance with one or more example embodiments.
Figure 3:
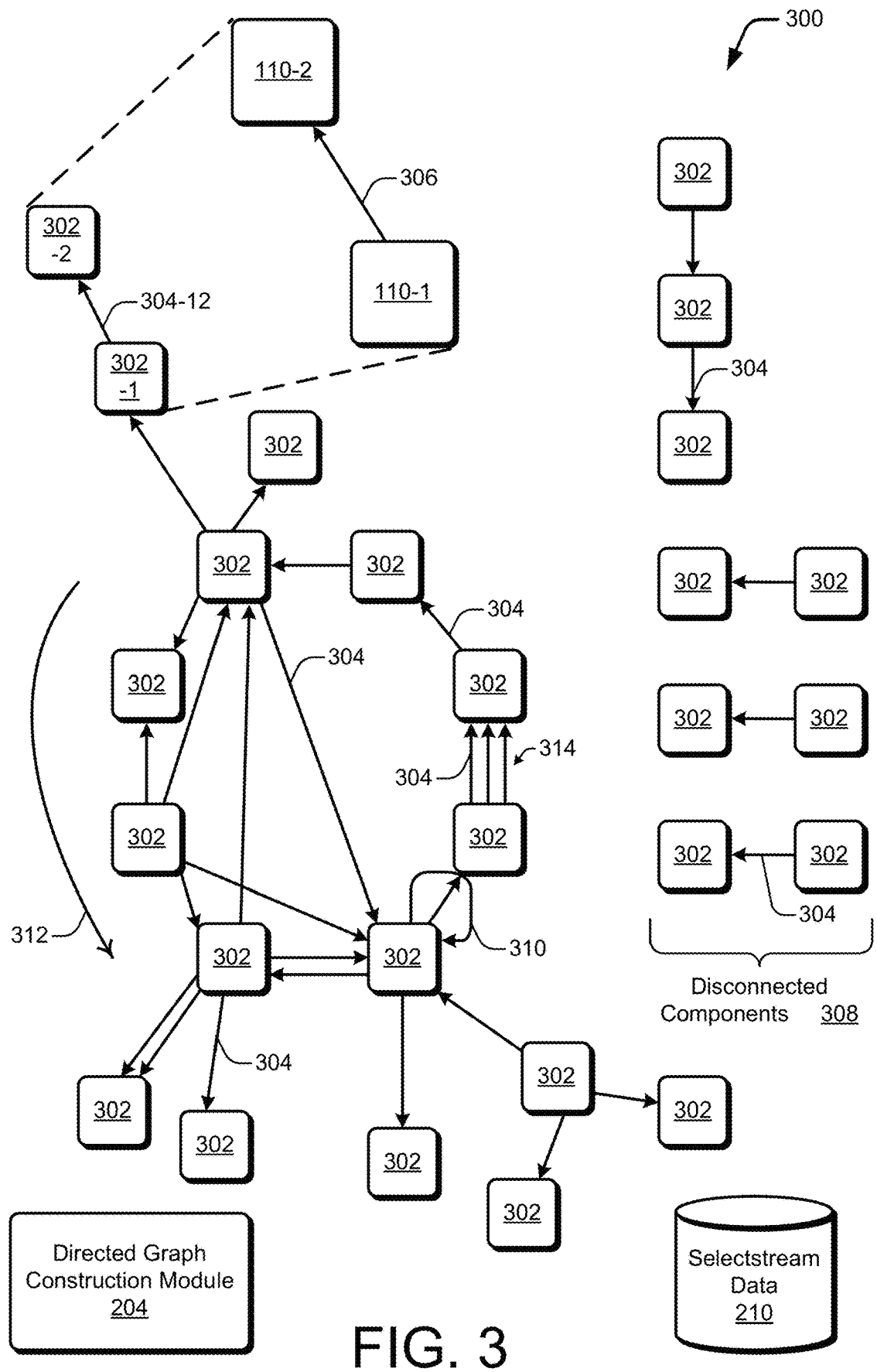
FIG. 3 depicts a directed graph construction module that constructs an example of a directed graph based on selectstream data in accordance with one or more example embodiments.
Figure 4:
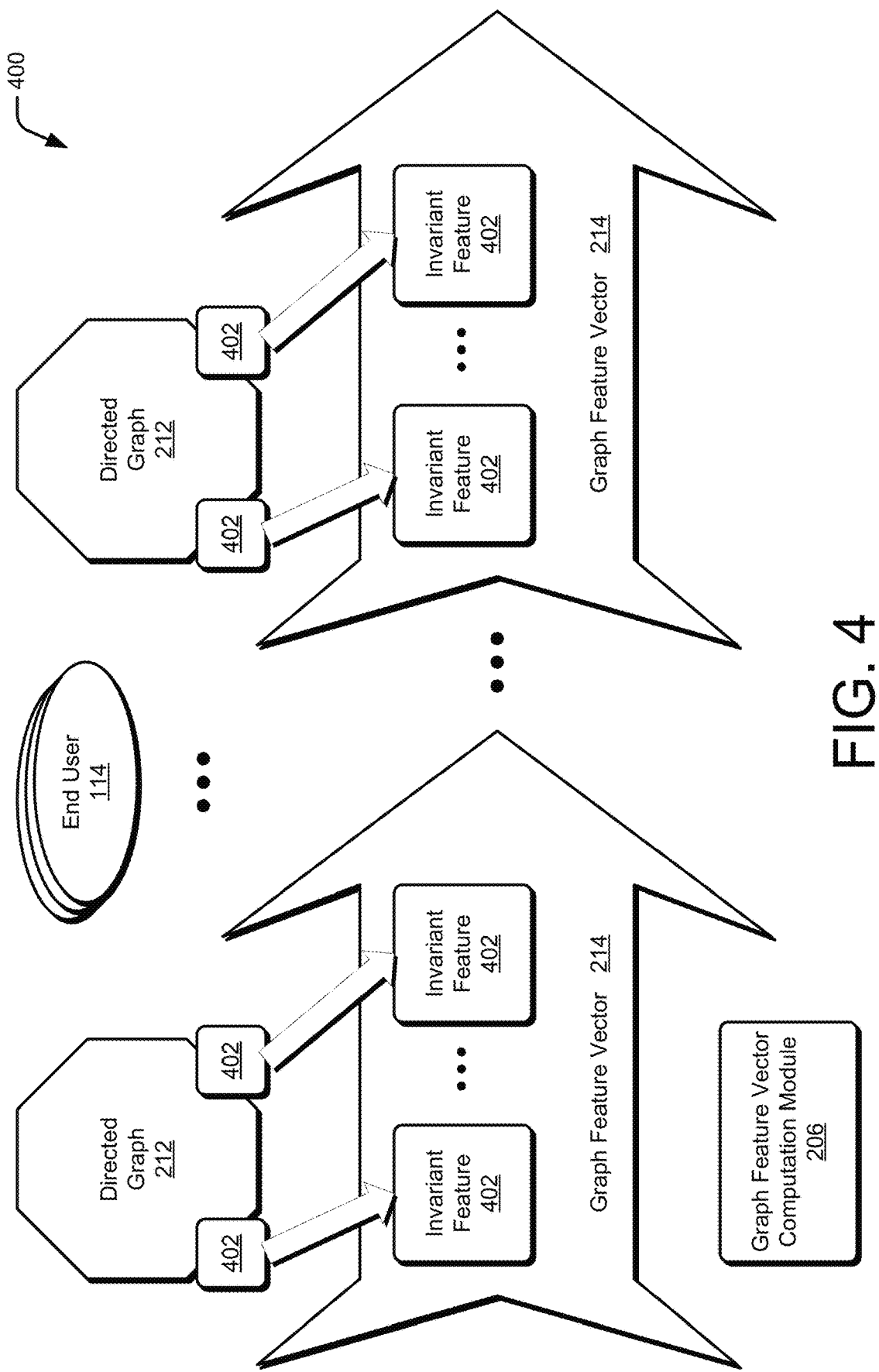
FIG. 4 depicts a graph feature vector computation module that computes a graph feature vector based on a directed graph in accordance with one or more example embodiments.
Figure 5:
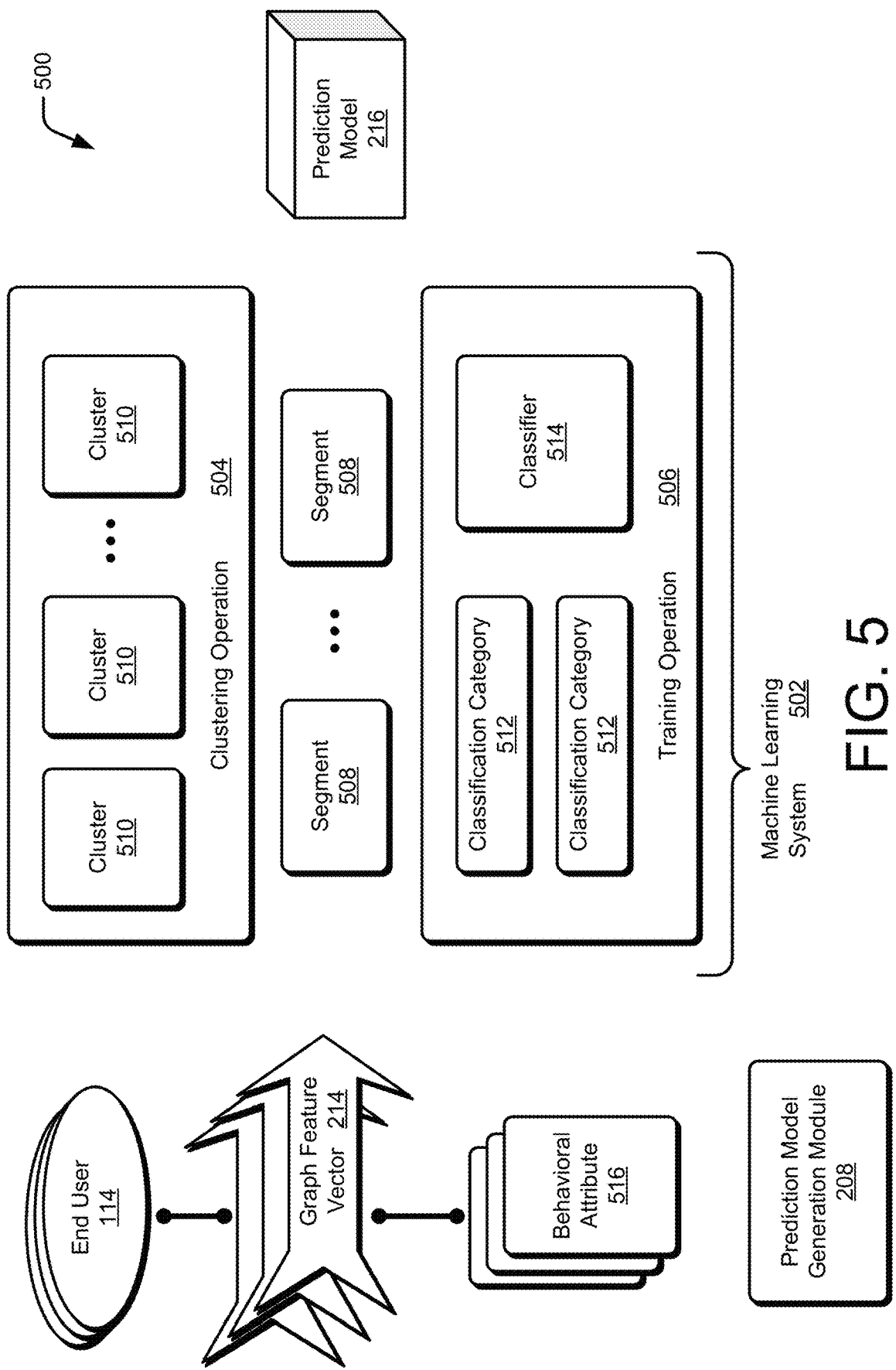
FIG. 5 depicts a prediction model generation module that generates a prediction model based on multiple graph feature vectors using a machine learning system in accordance with one or more example embodiments.
Figure 6:
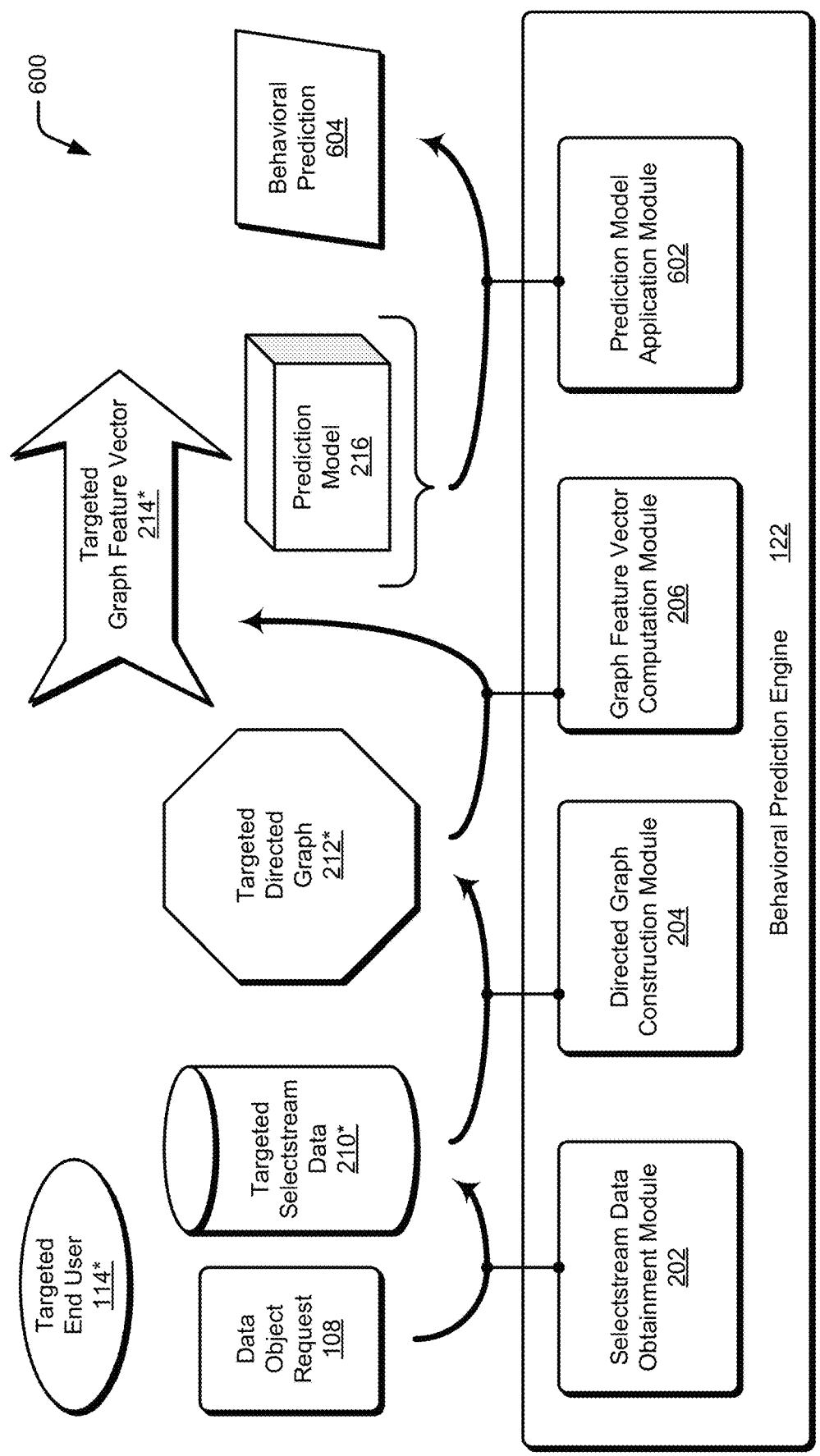
FIG. 6 illustrates an example behavioral prediction engine, which includes four modules, that operates to create a behavioral prediction for a targeted end user in accordance with one or more example embodiments.
Figure 7:
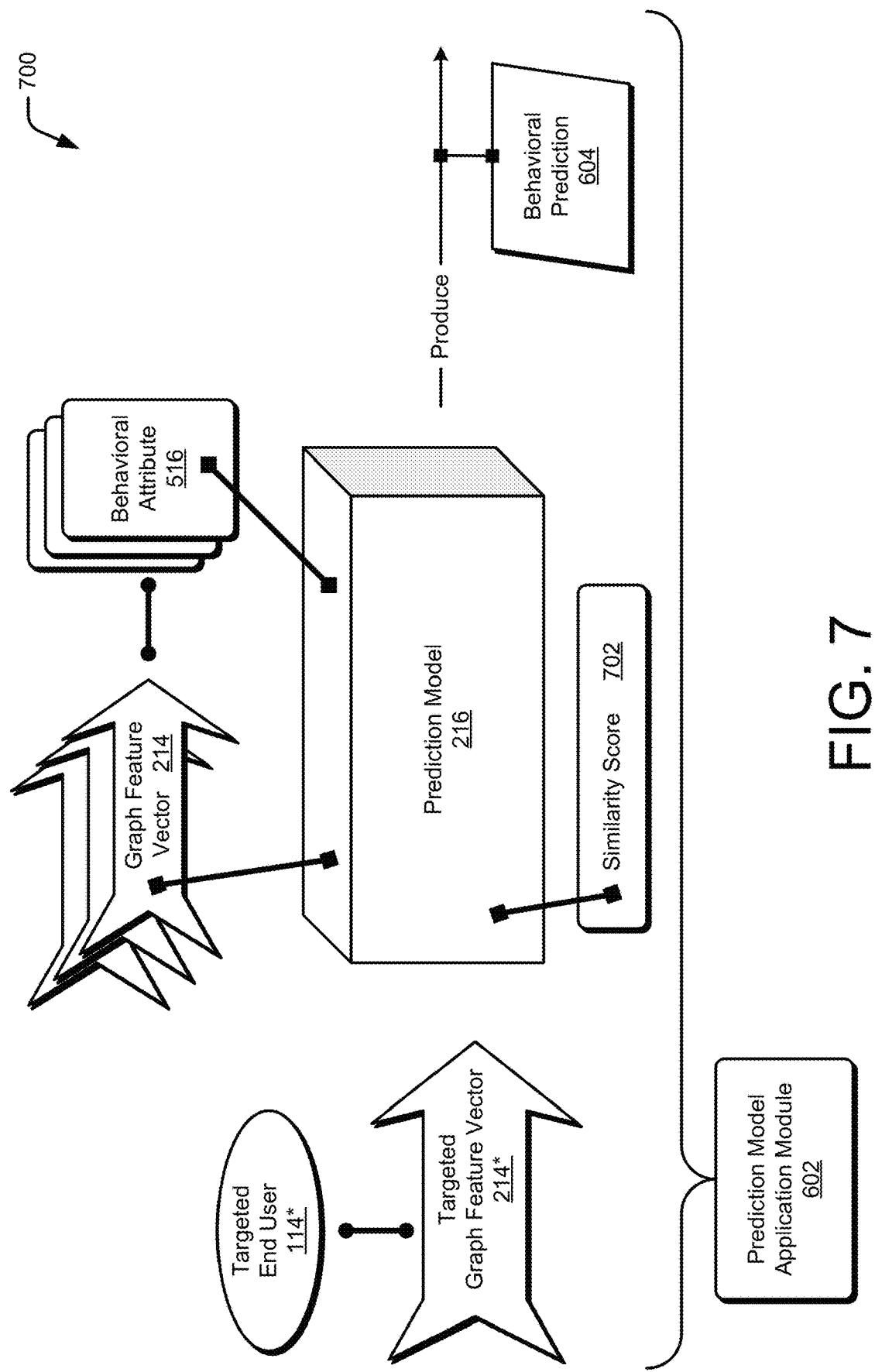
FIG. 7 depicts a prediction model application module that produces a behavioral prediction based on a targeted graph feature vector using a prediction model in accordance with one or more example embodiments.
Figure 8:
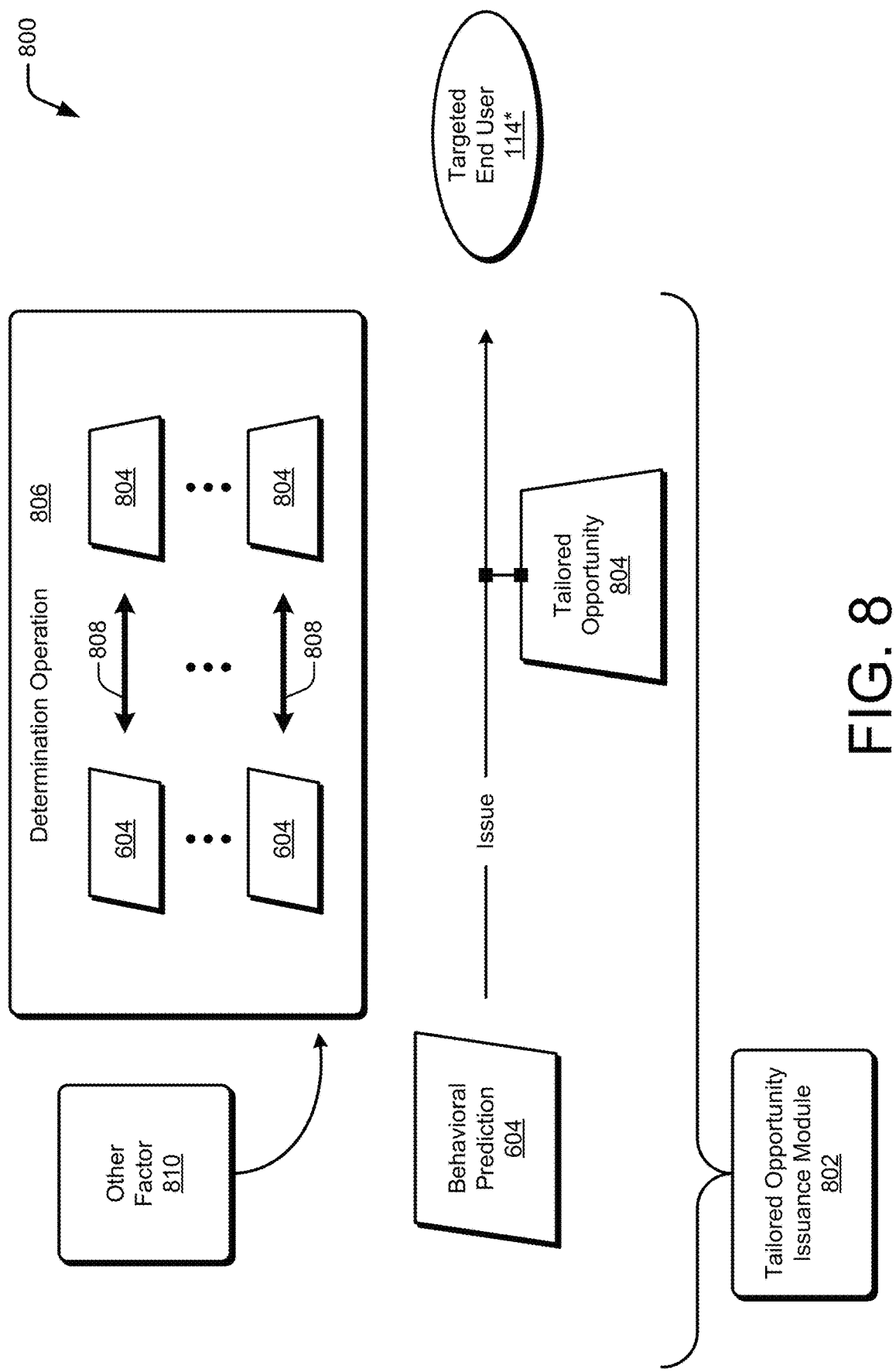
FIG. 8 depicts a tailored opportunity issuance module that issues a tailored opportunity to a targeted end user responsive to a behavioral prediction in accordance with one or more example embodiments.

This section describes some example details of systems or techniques for behavioral prediction for targeted end users in accordance with one or more embodiments. FIG. 2 illustrates at a relatively high level an example approach for creating a prediction model. FIGS. 3-5 illustrate at a relatively low level different aspects of the example approach for creating a prediction model. FIG. 6 illustrates at a relatively high level an example approach for using a prediction model. FIGS. 7 and 8 illustrate at a relatively low level different aspects of the example approach for using a prediction model.

FIG. 2 illustrates, as part of a prediction model creation scheme 200, an example behavioral prediction engine 122 that operates to create a prediction model 216 from select-stream data 210 in accordance with one or more example embodiments. As illustrated, the prediction model creation scheme 200 includes multiple data object requests 108 from multiple end users 114 and multiple instances of select-stream data 210. The prediction model creation scheme 200 further includes multiple directed graphs 212, multiple graph feature vectors 214, at least one prediction model 216, and a behavioral prediction engine 122. As shown, the behavioral prediction engine 122 includes four modules: a selectstream data obtainment module 202, a directed graph construction module 204, a graph feature vector computation module 206, and a prediction model generation module 208. Although three end users 114, three instances of selectstream data 210, etc. appear to be explicitly shown, it should be understood that fewer or more than three may be involved in the prediction model creation scheme 200.

In one or more example embodiments, the selectstream data obtainment module 202 obtains the selectstream data 210 for an end user 114 based on indications of requested data objects. As a first example, the indications may include the data object requests 108. For instance, a server device that is executing the behavioral prediction engine 122 may also be responding to the data object requests 108 from the object acquisition module 118 with the data object server module 120 (of FIG. 1). On the other hand, a separate server device that is executing the behavioral prediction engine 122 may be given access to the data object repository 116. As a second, alternative example, the indications may be extracted from a file that lists data objects 110 requested by the end user 114. Regardless, the selectstream data obtainment module 202 obtains respective selectstream data 210 for respective ones of the multiple end users 114.

The directed graph construction module 204 constructs the multiple directed graphs 212. Each respective directed graph 212 is constructed based on the selectstream data 210 corresponding to a respective end user 114 of the multiple end users 114. Each directed graph 212 is associated with one or more invariant features. Example implementations for the directed graph construction module 204, as well as further description of the directed graphs 212 and invariant features thereof, are discussed herein with particular reference to FIG. 3.

The graph feature vector computation module 206 computes the multiple graph feature vectors 214. Each respective graph feature vector 214 is computed based on the one or more invariant features that are associated with a respective directed graph 212 of the multiple directed graphs 212. Example implementations for the graph feature vector computation module 206, as well as further description of the graph feature vectors 214, are discussed herein with particular reference to FIG. 4.

The prediction model generation module 208 generates the prediction model 216 based on the multiple graph feature vectors 214 using a machine learning system. The prediction model 216 is implemented to produce a behavioral prediction responsive to analysis of targeted selectstream data that corresponds to a targeted end user. Example implementations for the prediction model generation module 208, as well as further description of the prediction model 216 and machine learning systems, are discussed herein with particular reference to FIG. 5. Additionally, a behavioral prediction, a targeted end user, targeted selectstream data, and creation and use of the prediction model 216 are described with particular reference to FIGS. 6-8.

FIG. 3 depicts a directed graph construction module 204 that constructs a directed graph 300 based on selectstream data 210 in accordance with one or more example embodiments. The directed graph construction module 204 may construct a directed graph to be representative of a path of travel of an end user as the end user traverses over multiple data objects. As illustrated, the example directed graph 300 includes multiple vertices 302 and multiple directed edges 304. Only some directed edges 304 are marked with the reference number "304" for the sake of clarity. Each directed edge 304 begins at one vertex 302 and terminates at another vertex 302; in other words, each directed edge 304 points from one vertex 302 to another vertex 302. For example, a vertex 302-1 and a vertex 302-2 are connected by a directed edge 304-12 that begins at the vertex 302-1 and terminates at the other vertex 302-2.

For one or more example embodiments, each vertex 302 corresponds to a data object 110 (of FIG. 1), and each directed edge 304 corresponds to a transition between two data objects 110. These correspondences are shown with reference to the vertex 302-1, the vertex 302-2, and the directed edge 304-12. Specifically, the vertex 302-1 represents a source data object 110-1, the vertex 302-2 represents a destination data object 110-2, and the directed edge 304-12 represents a transition 306 from the source data object 110-1 to the destination data object 110-2. In a WWW browser scenario, the pair of source and destination data objects may represent different web pages. For example, the source data object 110-1 may represent a first web page having a link to a second web page, which is represented by the destination data object 110-2. The transition 306 may represent a selection by an end user of the link on the first web page that points to the second web page so that the end user may traverse a portion of the WWW website from the first web page to the second web page.

For a mathematical description of one or more example embodiments in a WWW scenario, a path traversed by an end user visiting a website is modelled as a directed graph G(V,E) that is defined as follows:

V: a set of the URLs visited by the end user; and

E: set of all transitions (e.g., clicks) by the visiting end user. Each directed edge corresponds to one line of a set of clickstream data, with a source vertex being a referrer URL and a destination vertex being a current URL.

The directed graph captures the dynamics of the behavior of an end user over time across multiple visits to a website. Additionally, a dynamic transition from one data object 110 to another data object 110 may be made by an end user 114 more than once. As shown in FIG. 3 at an arrow 314, multiple edges 304 may be included between two vertices 302 if an end user 114 traverses between two corresponding data objects more than once. The number of traversals of each edge 304, such as three traversals at the arrow 314, may be included in one or more of the analyses that are described herein to create or use a prediction model 216.

As illustrated, the example directed graph 300 includes different types of graph sub-structures. For example, there are four disconnected components 308 on the right side of the directed graph 300 that each include two or three vertices 302. The directed graph 300 also includes a self-loop 310. Furthermore, the vertex 302 having the self-loop 310 is part of a cycle 312 of the directed graph 300.

In order to enable performance of machine learning on a directed graph, the directed graph is analyzed to compute some value on one or more aspects of the directed graph. For example, an adjacency matrix/list may be computed on a directed graph. However, the size of the resulting adjacency matrix would be too large and computationally unwieldy considering the vast number of URLs on an e.g. ecommerce website. The size of an adjacency matrix in such a context renders the adjacency matrix impractical. Using an adjacency matrix that is computed on a per end-user basis is problematic also because the number of vertices for each user graph would likely be different. Consequently, the dimensions of the adjacency matrix for different users would be different. Even if a rather high dimensional matrix were utilized (e.g., using the maximum number of distinct URLs ever visited by an end user as the size of the matrix), the adjacency matrices would have to be constructed with an arbitrary labelling. Machine learning algorithms would experience difficulty attempting to detect two isomorphic graphs so that the two isomorphic graphs could be classified to the same label. This difficulty arises in part because detecting graph isomorphism between just two graphs is a so-called NP-hard problem.

Therefore, instead of an adjacency matrix, performance of machine learning on a directed graph is enabled by computing one or more invariant features of the graph. In one or more example embodiments, computation of some invariant features results in a single vector of real-valued features for each directed graph. The computed invariant features enable consideration of at least one measure of similarity between two or more directed graphs. Two end users with similar behavior induce similar directed graphs as a result of their respective traversals of different data objects. Consequently, the invariant features that are computed on the similar directed graphs are close in an L-p norm sense, such as an L-2 norm sense. In an extreme case, if two directed graphs happen to be isomorphic, then the invariant features of the directed graphs are equal, and the L-2 norm distance between the directed graphs is zero (0).

For one or more example embodiments, a number of invariant features for graphs are identified and described below in list form. Some may have a physical significance to an ecommerce analyst. However, abstract invariant features may also be used. For invariant features having a physical significance in the context of e.g. ecommerce analytics in a WWW scenario, an example physical significance is noted below. For some of the invariant features listed below, reference is made to a global graph that corresponds to a site-map of e.g. a website. Such a global graph may have vertices that include each of the URLs on the website and may have edges that correspond to each available hyperlink on the webpages of the website.

The following invariant features are examples of intuitive invariant features that are translatable to a physical marketing concept:
  a. Number of vertices: Number of distinct pages browsed by an end user.
  b. Number of edges: Number of transition movements or clicks by the end user.
  c. Number of disconnected components: Number of different sections of the website that are independently browsed by the end user.
  d. Number of nodes in the largest component.
  e. Number of edges in the largest component: Captures user behavior in the largest browsed section.
  f. Number of self-loops: Indicates an end user is looking for some new information on the same page.
  g. Length of the shortest path from a start node to an end node for a given directed graph (which may be obtained from the global graph): Quantifies the exploratory nature of the visitor. The visitor may have actually reached the final destination in fewer steps, but the visitor intentionally or accidentally took a detour.
  h. Number of vertices in a path of a visitor before deviating from the shortest path from the start node to the end node (which reflects an intersection of a shortest path with a visitor path): Measure of the index till which the visitor was on the shortest path to reach the destination.
  i. Length of the shortest path between a start node of the visitor's directed graph and a purchase node in the global graph: Measure of proximity of a customer to a purchase event.
  j. Length of the shortest path between a start node of the visitor's directed graph and a product node in the global graph (for a product that is to be analyzed): Measure of proximity of a customer to a product node.
  k. Length of shortest path between an exit node and a purchase node in the global graph: Measure of how close a visitor was to making a purchase before bouncing out of the website.
  l. Maximum in degree of the visitor directed graph: A maximum number of repeat visits in an end user's browsing history.
  m. Minimum in degree of the visitor directed graph: A minimum number of repeat visits in an end user's browsing history.
  n. Existence of a cycle in the graph: Indicates a specific interest or navigational difficulties.

The following invariant features are examples of abstract invariant features that each pertain to at least one aspect of directed graph topology:
  o. Length of a cycle in a directed graph.
  p. Whether or not a directed graph is bipartite.
  q. Chromatic number of a directed graph.
  r. Diameter of a directed graph: The longest of the shortest path lengths between pairs of vertices.
  s. Girth: A length of the shortest cycle.
  t. Vertex connectivity: The smallest number of vertices whose removal disconnects the directed graph.
  u. Edge connectivity: The smallest number of edges whose removal disconnects the directed graph.
  v. Clique number: The largest order of a complete subgraph.

Although particular examples of invariant features of graphs are described above, other graph features may alternatively be used for computing one or more dimensions of a graph feature vector.

FIG. 4 depicts a graph feature vector computation module 206 that computes a graph feature vector 214 based on a directed graph 212, as part of a graph feature vector computation scheme 400, in accordance with one or more example embodiments. As illustrated, the graph feature vector computation scheme 400 includes the graph feature vector computation module 206, multiple directed graphs 212 that respectively correspond to multiple end users 114, and multiple graph feature vectors 214 that respectively correspond to the multiple directed graphs 212.

In one or more example embodiments, each directed graph 212 includes one or more invariant features 402, examples of which are described above with particular reference to FIG. 3. In operation, the graph feature vector computation module 206 computes an invariant feature 402 of a given directed graph 212 and incorporates the computed invariant feature 402 into a corresponding graph feature vector 214 as a dimension thereof. By way of example only, the graph feature vector computation module 206 may compute a real value for (i) a length of the shortest path between a start node of an end user's directed graph and a purchase node in a global graph of an associated website and (ii) a chromatic number of the end user's directed graph and may populate a graph feature vector 214 with the real number values.

FIG. 5 depicts a prediction model generation module 208 that generates a prediction model 216 based on multiple graph feature vectors 214 using a machine learning system 502, as part of a prediction model generation scheme 500, in accordance with one or more example embodiments. As illustrated for the prediction model generation scheme 500, multiple graph feature vectors 214 respectively correspond to multiple end users 114 and multiple behavioral attributes 516. The graph feature vectors 214 and the corresponding behavioral attributes 516 may be used in the machine learning system 502.

For one or more example embodiments, an end user 114 may be associated with at least one behavioral attribute 516. Each behavioral attribute 516 represents a behavior exhibited by the associated end user 114 as part of, as a result of, or in conjunction with the corresponding graph feature vector 214. Examples of a behavioral attribute 516 include made a purchase, signed up for email communications, was receptive to a chat invitation, selected a particular product, bought a certain total amount of goods or services, provided feedback or a product review, permanently left a website, returned to a website after some elapsed time, or some combination thereof.

Two example types of machine learning systems 502 are illustrated: (i) a cluster-based machine learning system having a clustering operation 504 and (ii) a classification-based machine learning system having a training operation 506. With regard to the clustering operation 504, the multiple graph feature vectors 214 are separated into multiple clusters 510 based on one or more similarities between or among different ones of the multiple graph feature vectors 214. A k-means clustering algorithm, with k set to a value between three and seven, may be used, for example. Other examples of clustering approaches include density-based clustering, distribution-based clustering, hierarchical clustering, or combinations thereof.

The end users 114 may also be separated into different segments 508 in accordance with the corresponding behavioral attributes 516 or other known attributes, such as those from demographic information or marketing data. Correlations between, intersections of, concentrations of one within the other, and so forth of the segments 508 with respect to the clusters 510 may be used as part of the prediction model 216.

For example, the distribution of end users 114 belonging to different segments 508 across various clusters 510 may be ascertained. Hence, a percentage of end users 114 that belong to a given segment of the different segments 508 may be ascertained for each cluster of the various clusters 510. For instance, four of five clusters 510 may have between 75 and 100% of their clustered graph feature vectors 214 corresponding to end users 114 that belong to a segment 508 of engaged end users, with the fifth cluster 510 having less than 35% belonging to the engaged visitor segment. As another example, if 80% of the end users 114 that are separated into a particular cluster 510 make a purchase if offered free shipping via a code from a pop-up window, then a new, targeted end user that corresponds to a targeted graph feature vector that is similar to those graph feature vectors 214 of the particular cluster 510 may be predicted to be convertible into a customer with a free shipping offer.

The following list describes example types of segments 508 that may be established. End users 114 may be placed into one or more of the following segments.
  a. From search results page: An end user that is arriving at a website as a result of a search query.
  b. Inbound Homepage: End users entering a website from a homepage of the website.
  c. Engaged Visitors: End users requesting greater than a particular number, such as three, page views in one session.
  d. Page 1: End users who have visited a sample URL A (e.g., a website homepage).
  e. Page 2: End users who have visited a sample URL B (e.g., a deal-of-the-day webpage).
  f. Homepage Exiters: End users who exit from a homepage of a website.
  g. Missing in Action: End users who are missing in action.
  h. Window Shoppers: End users who are frequent or repeat visitors but have no purchase history.
  i. Frequent Visitors: End users having greater than some number, such as five, visits in a given time frame.
  j. Mobile Users: End users who are operating via a mobile device.

Although particular examples of definitions or criteria for establishing segments are described above, other definitions or criteria for segments may alternatively be used for a clustering or another machine-learning-related operation.

With regard to the training operation 506, a training set of graph feature vectors may be provided by associating respective ones of at least a portion of the multiple graph feature vectors 214 with a respective classification category 512. For example, a respective classification category 512 for a respective graph feature vector 214 may be determined using a corresponding behavioral attribute 516. For instance, two classification categories 512 may be "converts to a purchase" and "does not convert to a purchase." A classifier 514 is trained using the provided training set of graph feature vectors such that a new, targeted graph feature vector may be classified by the machine learning system 502 as part of the prediction model 216.

Although the discussion of the prediction model generation scheme 500 explicitly addresses clustering and classification approaches to machine learning, other approaches may additionally or alternatively be implemented. Other example approaches include, but are not limited to, those that are identified herein above in the "Terminology Examples" section. Although the discussion of the prediction model generation scheme 500 explicitly describes including features from the multiple graph feature vectors 214 as part of the machine learning system 502 or the prediction model 216, other features may additionally be included. Other example features may include, but are not limited to, those that are identified herein above as pertaining to static characteristics of an end user.

FIG. 6 illustrates, as part of a prediction model usage scheme 600, an example behavioral prediction engine 122 that operates to create a behavioral prediction 604 for a targeted end user 114* in accordance with one or more example embodiments. As illustrated, the prediction model usage scheme 600 includes multiple data object requests 108 from the targeted end user 114* and an instance of targeted selectstream data 210*. The prediction model usage scheme 600 further includes a targeted directed graph 212*, a targeted graph feature vector 214*, the prediction model 216, and at least one behavioral prediction 604, as well as the behavioral prediction engine 122. As shown, the behavioral prediction engine 122 includes four modules: a selectstream data obtainment module 202, a directed graph construction module 204, a graph feature vector computation module 206, and a prediction model application module 602.

In one or more example embodiments, the behavioral prediction engine 122 of the prediction model usage scheme 600 analyzes data objects that are requested by a targeted end user 114*. In other words, the prediction model usage scheme 600 is directed to an end user who is to be targeted for behavior prediction using the prediction model 216 that was previously generated based on the dynamic behaviors of other end users. The modules 202, 204, and 206 of the behavioral prediction engine 122 of the prediction model usage scheme 600 may be the same as or may be different from those of the behavioral prediction engine 122 of the prediction model creation scheme 200 (of FIG. 2).

Accordingly, the selectstream data obtainment module 202 obtains the targeted selectstream data 210* for the targeted end user 114* based on indications of data object requests 108 that were submitted by the targeted end user 114*. The indications may comprise the data object requests 108 or may merely include an identification of the requested data objects, as well as transitions there between. The directed graph construction module 204 constructs the targeted directed graph 212* based on the targeted selectstream data 210*. The graph feature vector computation module 206 computes the targeted graph feature vector 214* based on the targeted directed graph 212*.

The prediction model application module 602 is implemented to apply the targeted graph feature vector 214* to the prediction model 216 to produce the behavioral prediction 604 for the targeted end user 114*. Example implementations for the prediction model application module 602, as well as further description of the behavioral prediction 604, are discussed herein with particular reference to FIG. 7. Example uses of the behavioral prediction 604 are described herein with particular reference to FIG. 8.

FIG. 7 depicts, as part of a prediction model application scheme 700, a prediction model application module 602 that produces a behavioral prediction 604 based on a targeted graph feature vector 214* using a prediction model 216 in accordance with one or more example embodiments. As illustrated, the prediction model application scheme 700 involves a targeted end user 114* that is associated with the targeted graph feature vector 214*. The prediction model 216 includes, uses, is generated from, or is otherwise related to multiple graph feature vectors 214, multiple corresponding behavioral attributes 516 exhibited by multiple end users 114 (of FIGS. 2 and 5), and at least one similarity score 702.

In one or more example embodiments, the similarity score 702 includes or represents a measure of similarity between or among the targeted graph feature vector 214* and one or more of the multiple graph feature vectors 214. An example of a measure of similarity is an L-p norm distance between at least two graph feature vectors. For instance, the smaller the Euclidean distance between two vectors, the greater the similarity. Based on the similarity score 702, one or more vectors of the multiple graph feature vectors 214 may be identified as being similar to the targeted graph feature vector 214* as a result of the application of the prediction model 216 to the targeted graph feature vector 214*. In operation, the prediction model application module 602 assigns to the behavioral prediction 604 at least one behavioral attribute 516 that corresponds to the one or more identified graph feature vectors 214 to produce the behavioral prediction 604.

Although the discussion of the prediction model application scheme 700 explicitly describes including features from the targeted graph feature vector 214* as inputs to the prediction model 216, other features may additionally be included as inputs. Other example feature inputs may include, but are not limited to, those that are identified herein above as pertaining to static characteristics of an end user, which is being targeted for behavioral prediction.

For one or more example implementations of behavioral targeting using clustering, the graph feature vectors 214 corresponding to end users 114 (of FIGS. 2 and 4) may be clustered to a fixed number of groups using e.g. a k-means clustering algorithm. Because the dimensions of the graph feature vectors capture dynamic user behavior, end users with similar behavior tend to cluster together. Clusters may be utilized in a variety of manners. For example, a distribution of an end user segment over multiple clusters may be analyzed. Because a segment is a subset of end users, each segment may be defined by a set of end-user characteristics or merely by end-user identifications. Reviewing the distribution of clusters over segments, or vice versa, may reveal one or more aspects of a targeted end user that fits into a given cluster. If a distribution of end users in a given cluster for a particular behavioral attribute is high, then that cluster may be used for behavioral targeting by associating an action to that cluster. In other words, a tailored opportunity, which may correspond to a web server taking some action in a WWW ecommerce scenario, may be associated with one or more of the clusters. Thus, an associated action may be taken responsive to a targeted end user being assigned to a given cluster.

An example of behavioral targeting using a clustering machine learning environment is described as follows. In this example, a behavioral prediction for a targeted end user that a company has no prior information on can be made in a WWW scenario. The targeted end user is permitted to traverse a website by visiting multiple webpages. Each webpage selection by the targeted end user can cause a behavioral prediction engine to update a cluster to which the targeted end user is being mapped. The cluster updating may cease when the cluster index stabilizes. For instance, the updating may cease if the cluster index is unchanged after a certain number of consecutive iterations of dynamic user behavior—such as after two consecutive iterations. It may be inferred that the behavior of the targeted end user is or will be similar to previous end users assigned to the stabilized cluster. Hence, a behavioral prediction may be produced based on one or more behaviors assigned to the stabilized cluster.

For one or more example implementations of behavioral targeting using classifying, the graph features may be used to classify end users into classification categories corresponding to behavioral attributes. An SVM classifier, for instance, may be used to predict whether a targeted end user is likely to convert and make a purchase without the company taking an inducing action. Additionally or alternatively, classifiers may be built that predict other behavioral attributes, such as 'is likely to abandon cart,' 'is likely to return,' and so forth.

FIG. 8 depicts, as part of a tailored opportunity issuance scheme 800, a tailored opportunity issuance module 802 that issues a tailored opportunity 804 to a targeted end user 114* responsive to a behavioral prediction 604 in accordance with one or more example embodiments. As illustrated, the tailored opportunity issuance scheme 800 further includes another factor 810 and a determination operation 806. The determination operation 806 may involve one or more behavioral predictions 604, one or more tailored opportunities 804, and one or more association rules 808. The tailored opportunity issuance module 802 may be part of a behavioral prediction engine 122 (of FIG. 2 or 6). Alternatively, the tailored opportunity issuance module 802 may be separate from a behavioral prediction engine 122. Especially if separate, the tailored opportunity issuance module 802 may be executed by a different entity, such as a different company, than the behavioral prediction engine 122.

In one or more example embodiments, the tailored opportunity issuance module 802 is implemented to issue the tailored opportunity 804 to the targeted end user 114* responsive to the behavioral prediction 604. The tailored opportunity issuance module 802 may use the determination operation 806. The determination operation 806 may have access to multiple behavioral predictions 604, including types of or labels for various behavioral predictions, that are respectively associated with multiple tailored opportunities 804. With the determination operation 806, the tailored opportunity 804 may be determined using at least one association rule 808. The association rule 808, which may also be termed a targeting rule, enables a new end user to be targeted with an opportunity appropriate for a predicted behavior. The tailored opportunity 804 may be issued to the targeted end user 114* with an email, using a displayed message—such as in a pop-up window, using a speaker, with a text message, with a phone call, some combination thereof, and so forth.

The determination operation 806 may further determine a tailored opportunity 804 based on at least one other factor 810. For example, one or more determinable static characteristics of the targeted end user 114* may be incorporated into the determination operation 806 another factor 810. Alternatively, if some history is known about the targeted end user 114*, such as a history derived from previous purchases of a targeted end user that is not completely new or unknown or a browsing history via cookie inspection, the history may be incorporated as another factor 810. Furthermore, information extracted from social networks may be included as another factor 810, or as part of the creation or usage of a prediction model.

In an example usage scenario, a marketer may use a classifier based on dynamic webpage transitions to identify a website visitor having a propensity to convert. A propensity score may be incorporated into a visitor's profile and applied to targeting rules to increase a lifetime value of a customer and therefore generate higher lift. For example, a discount opportunity may be omitted for visitors with a high likelihood to convert, but visitors with a medium likelihood to convert may be enticed with a discount opportunity or merely with one or more emails or ads.

In another example usage scenario, a marketer can cluster visitors based on a distance measurement using graph features as described herein and can derive insights about the visitors from the clusters. For example, the marketer can review a distribution of visitors belonging to a particular segment of interest, such as visitors who frequent the site but have not made a purchase, and ascertain whether the segment is concentrated in just one or a few clusters. This analysis provides the marketer with insight into the nature of the particular segment. Furthermore, if many of the visitors in a given cluster belong to a particular segment of interest, the marketer can create an association/targeting rule based on this distribution of the particular segment within the given cluster. To implement such targeting, the graph features of a visitor and the distance of the corresponding graph feature vector to the center of the given cluster can be computed. If the distance is less than some selected threshold distance, then the targeting rule can be triggered to issue a tailored opportunity in an attempt to induce the visitor to perform some action.

In other example usage scenarios, the graph features as described herein may be utilized in other machine learning tasks that are designed to build models of visitor attrition, to forecast website traffic, to anticipate a propensity to buy a specific class of products, or some combination thereof, and so forth. Moreover, the graph features as described herein may be utilized as variables in an automated personalization algorithm, such as those used in the ADOBE® TARGET product, to determine which offer, if any, to issue to a website visitor. Because the graph features represent the likely unique behavior of a website visitor, using these graph features as variables can improve the algorithm and hence the lift generated by automated personalization activity.

For an example implementation scenario, assume there are three months of clickstream data for a website. Twenty-five graph features are considered that are based on a variety of graph invariants. These graph features are evaluated for each visitor traversal. Clustering with k=7 results in seven non-uniformly-distributed clusters. Two segments are considered: $S_1$-visitors that enter the website from a search page; and $S_2$-visitors who are window shoppers. We evaluate the percentage of visitors of a particular cluster who belong to each segment. Based on a threshold value or percentage, each cluster may be classified or labelled as being predominantly visitors from search or window shopper visitors, depending upon the percentages. An unknown visitor traversing over the website is mapped onto a cluster using e.g. L-2 norm similarity and can thus be classified with the label that the mapped cluster is associated with.

Having discussed example details of systems and techniques for behavioral prediction for targeted end users, consider now some example procedures to illustrate additional aspects of the techniques.

Example Procedures

This section describes example procedures for behavioral prediction for targeted end users in one or more embodiments. Aspects of the procedures may be implemented in hardware, firmware, or software, or a combination thereof. The procedures are shown as a set of blocks that specify operations that may be performed by one or more devices, but the operations are not necessarily limited to the orders as shown for performing the operations by the respective blocks, for the operations may be performed in other orders or in fully or partially overlapping manners. In at least some embodiments, the procedures may be performed by a suitably configured device, such as an example server device 102 (FIG. 1) that makes use of a behavioral prediction engine 122.

Figure 9:
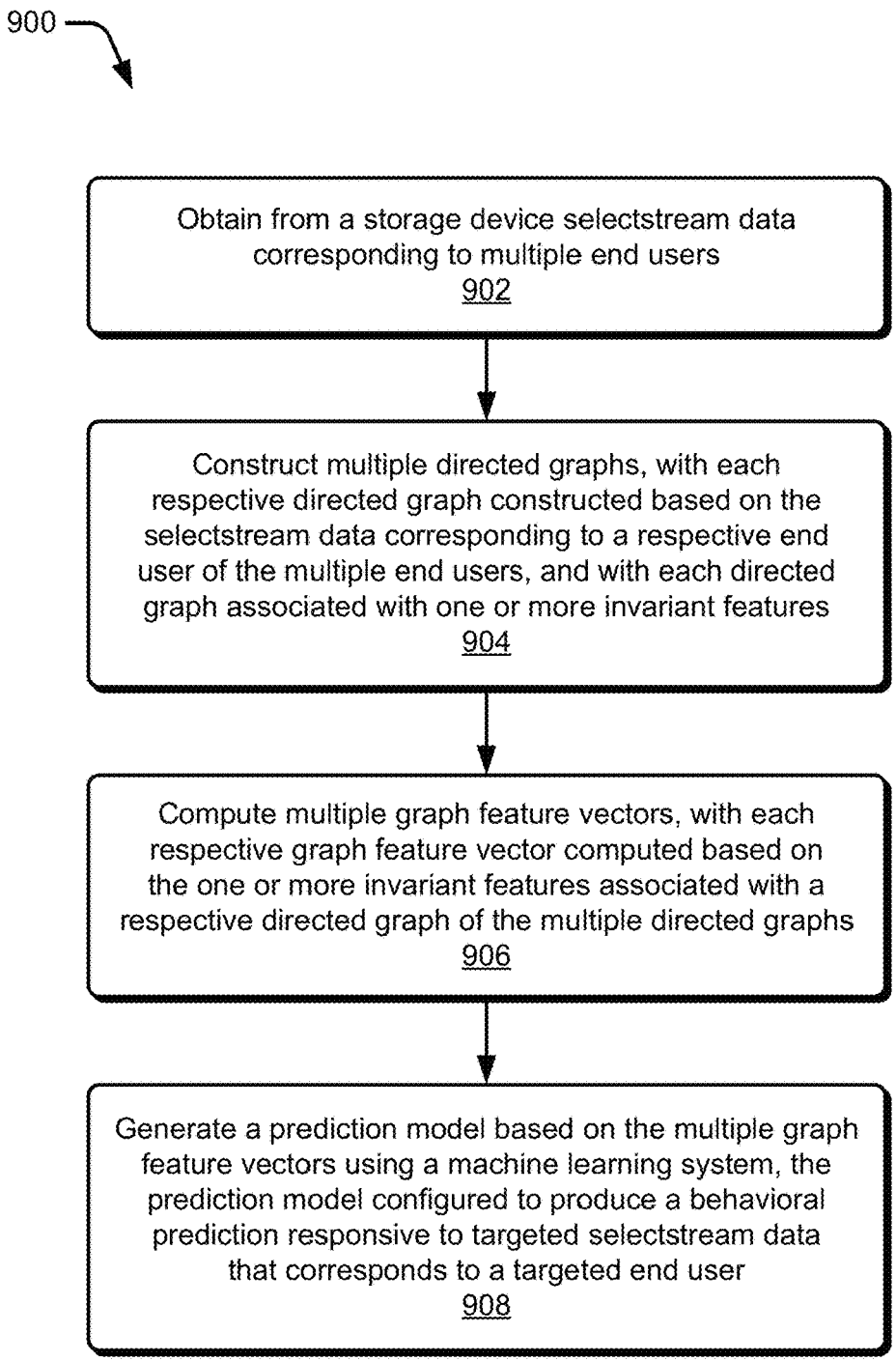
FIG. 9 is a flow diagram illustrating an example procedure in accordance with one or more example embodiments.

FIG. 9 is a flow diagram 900 that includes four blocks 902-908 and that illustrates an example procedure in accordance with one or more example embodiments. At block 902, selectstream data corresponding to multiple end users is obtained from a storage device. For example, a selectstream data obtainment module 202 may obtain selectstream data 210 that corresponds to multiple end users 114 from a storage device, such as a memory/storage 1212. To effectuate an obtainment, the selectstream data obtainment module 202 may be part of a device that is servicing data object requests 108 or may otherwise be provided access to the data object requests 108, or the selectstream data obtainment module 202 may receive at least one data structure identifying selected data objects 110 as well as data object sources of the requests for the selected data objects 110 to establish transitional information between pairs of data objects.

At block 904, multiple directed graphs are constructed with each directed graph being associated with one or more invariant features, and with each respective directed graph being constructed based on the selectstream data corresponding to a respective end user of the multiple end users. For example, a directed graph construction module 204 may construct multiple directed graphs 212, with each directed graph 212 having one or more invariant features 402, and such that each respective directed graph 212 is constructed based on the selectstream data 210 corresponding to a respective end user 114 of the multiple end users 114.

At block 906, multiple graph feature vectors are computed with each respective graph feature vector being computed based on the one or more invariant features associated with a respective directed graph of the multiple directed graphs. For example, a graph feature vector computation module 206 may compute multiple graph feature vectors 214 with each respective graph feature vector 214 being computed based on the one or more invariant features 402 that are associated with a respective directed graph 212 of the multiple directed graphs 212.

At block 908, a prediction model is generated based on the multiple graph feature vectors using a machine learning system, wherein the prediction model is configured to produce a behavioral prediction responsive to targeted selectstream data that corresponds to a targeted end user. For example, a prediction model generation module 208 may generate a prediction model 216 based on the multiple graph feature vectors 214 using a machine learning system 502, wherein the prediction model 216 is configured to produce a behavioral prediction 604 responsive to targeted selectstream data 210* that corresponds to a targeted end user 114*.

Figure 10:
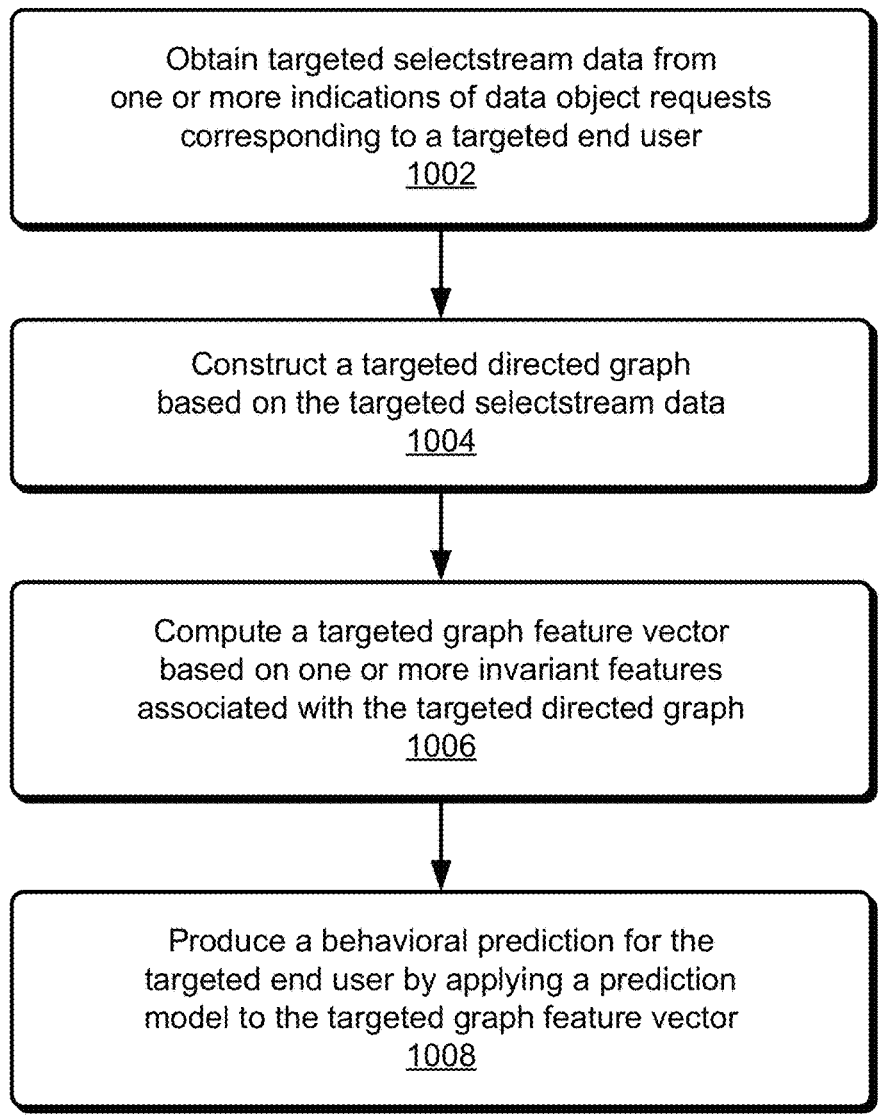
FIG. 10 is another flow diagram illustrating another example procedure in accordance with one or more example embodiments.

FIG. 10 is a flow diagram 1000 that includes four blocks 1002-1008 and that illustrates another example procedure in accordance with one or more example embodiments. At block 1002, targeted selectstream data is obtained from one or more indications of data object requests corresponding to a targeted end user. For example, a selectstream data obtainment module 202 may obtain targeted selectstream data 210* from one or more indications of data object requests 108 that correspond to a targeted end user 114*. The indications may comprise data object requests 108 or may include multiple pairs of source data objects 110-1 and destination data objects 110-2. In one example instance, the indications may include a list of data objects 110 with the source data objects 110-1, the destination data objects 110-2, or a relationship between source and destination data objects being implicitly indicated through a formatting protocol in which an immediately-previous data object in a list serves as the source data object for an immediately-subsequent destination data object.

At block 1004, a targeted directed graph is constructed based on the targeted selectstream data. For example, a directed graph construction module 204 may construct a targeted directed graph 212* based on the targeted selectstream data 210*. To do so, the directed graph construction module 204 may, for instance, designate (i) data objects 110 as vertices 302 of a directed graph and (ii) links pointing from a source data object 110-1 to a destination data object 110-2 as directed edges 304 that start at the source data object 110-1 and end at the destination data object 110-2 to represent a transition 306 there between.

At block 1006, a targeted graph feature vector is computed based on one or more invariant features associated with the targeted directed graph. For example, a graph feature vector computation module 206 may compute a targeted graph feature vector 214* based on one or more invariant features 402 that are associated with the targeted directed graph 212*. To do so, the graph feature vector computation module 206 may, for instance, compute real values for multiple features that are invariant between two isomorphic graphs.

At block 1008, a behavioral prediction is produced for the targeted end user by applying a prediction model to the targeted graph feature vector. For example, a prediction model application module 602 may produce a behavioral prediction 604 for the targeted end user 114* by applying a prediction model 216 to the targeted graph feature vector 214*. To do so, the prediction model application module 602 may, for instance, apply the targeted graph feature vector 214* to the prediction model 216 that was generated using at least one machine learning approach, such as clustering or classification, to directly or indirectly determine one or more measures of similarities between the targeted graph feature vector 214* and one or more other graph feature vectors 214.

Figure 11:
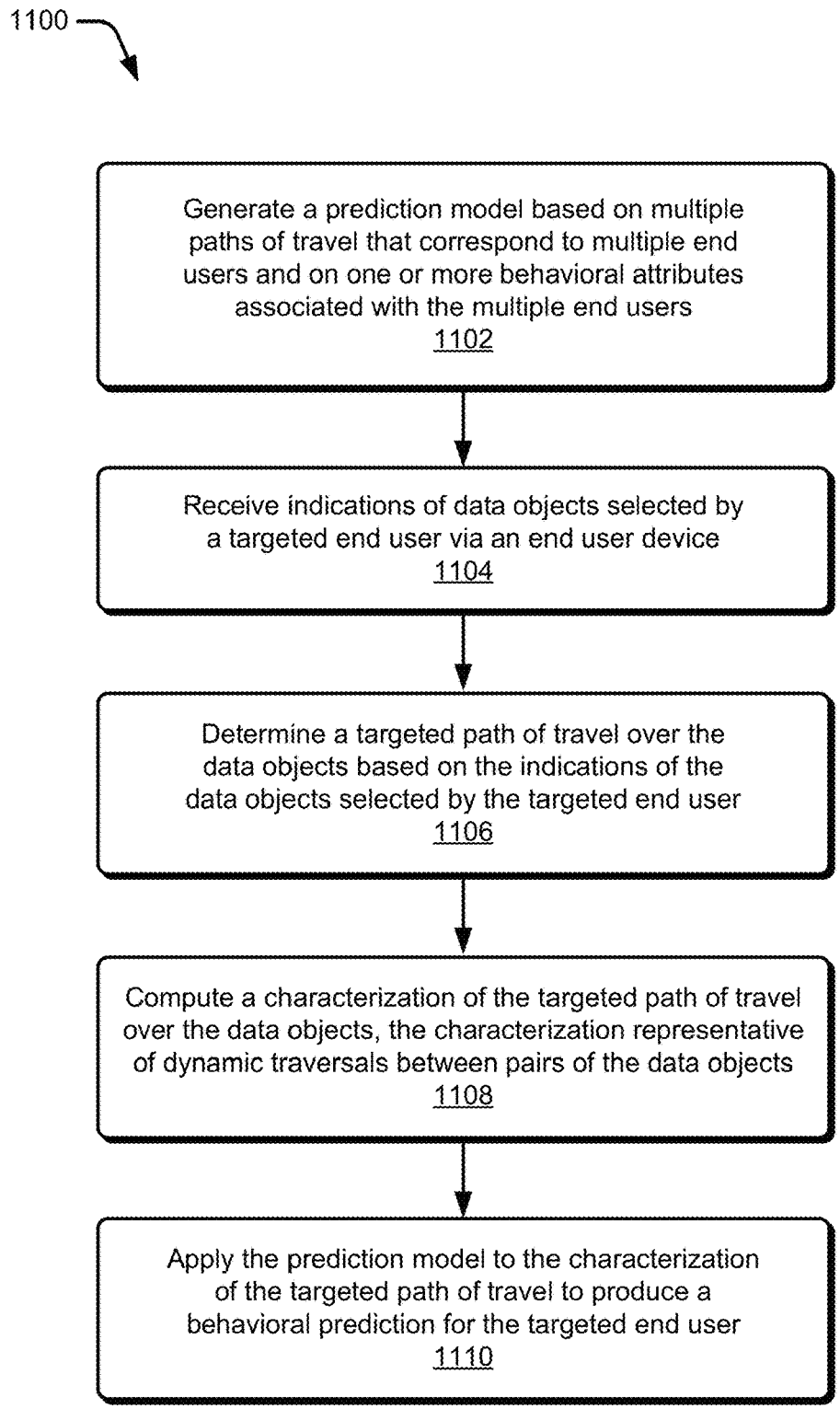
FIG. 11 is yet another flow diagram illustrating yet another example procedure in accordance with one or more example embodiments.

FIG. 11 is a flow diagram 1100 that includes five blocks 1102-1110 and that illustrates yet another example procedure in accordance with one or more example embodiments. At block 1102, a prediction model is generated based on multiple paths of travel that correspond to multiple end users and on one or more behavioral attributes associated with the multiple end users. For example, a prediction model 216 may be generated based on multiple paths of travel that correspond to multiple end users 114 and based on one or more behavioral attributes 516 that are associated with the multiple end users 114. The prediction model 216 may be generated, for instance, using a machine learning system 502 with a first set of inputs representative of dynamic transitions from one data object to another data object over a collection of data objects 110 and with a second set of inputs including or representing labels indicative of actions taken by associated ones of the multiple end users 114, with the first and second sets of inputs corresponding to respective ones of the multiple end users 114. In example implementations, the data objects 110 may comprise webpages, and the collection of data objects 110 may comprise a website.

At block 1104, indications of data objects selected by a targeted end user via an end-user device are received. For example, indications of data objects 110 that are selected by a targeted end user 114* via an end-user device 104 may be received. A server device 102 may receive, for instance, URLs for which the targeted end user 114 clicked or pressed corresponding links using the end-user device 104, with the URLs identifying webpages of a web site.

At block 1106, a targeted path of travel over the data objects is determined based on the indications of the data objects selected by the targeted end user. For example, a targeted path of travel over the data objects 110 may be determined based on the indications of the data objects 110 as selected by the targeted end user 114*. For instance, the server device 102 may determine how an end user, whose behavior is to be predicted for targeting purposes, dynamically explored a website using URLs that are selected by the targeted end user. Dynamic transitions of the targeted path of travel may be determined with regard to what webpage included a particular link corresponding to a particular URL as well as to which webpage the particular link pointed. In example implementations, the URLs may be organized into a graph having edges that indicate a direction of transition between pairs of URLs as part of the path of travel over the website.

At block 1108, a characterization of the targeted path of travel over the data objects is computed, with the characterization representative of dynamic traversals between pairs of the data objects. For example, a characterization of, such as a textual description of or a mathematical relationship embodying aspects of, the targeted path of travel over the data objects 110 may be computed, with the characterization representative of dynamic transitions from one data object to another data object. For instance, one or more numerical values may be computed with the numerical values being impacted by the presence of a link between a pair of URLs of a pair of webpages of the website, as well as by which URL of the pair of URLs is the referring or originating webpage. In example implementations, the one or more numerical values may be arranged as a vector.

At block 1110, the prediction model is applied to the characterization of the targeted path of travel to produce a behavioral prediction for the targeted end user. For example, the prediction model 216 may be applied to the characterization of the targeted path of travel to produce a behavioral prediction 604 for the targeted end user 114*. For instance, one or more calculated numerical values, which depend at least partially on directed transitions that are made by a targeted end user between webpages, may be directly or indirectly compared as part of a prediction model to other calculated numerical values, which depend at least partially on other paths of travel that are made by other end users. The prediction model may be generated by, or may otherwise use, one or more approaches to machine learning. In example implementations, one or more comparisons reveal at least some measure of similarity between the one or more calculated numerical values and at least some of the other calculated numerical values. At least one corresponding behavioral attribute 516 of the similar other calculated numerical values may be used to derive the behavioral prediction 604.

Having described example procedures in accordance with one or more embodiments, consider now an example system and device that can be utilized to implement the various techniques described herein.

Example System and Device

Figure 12:
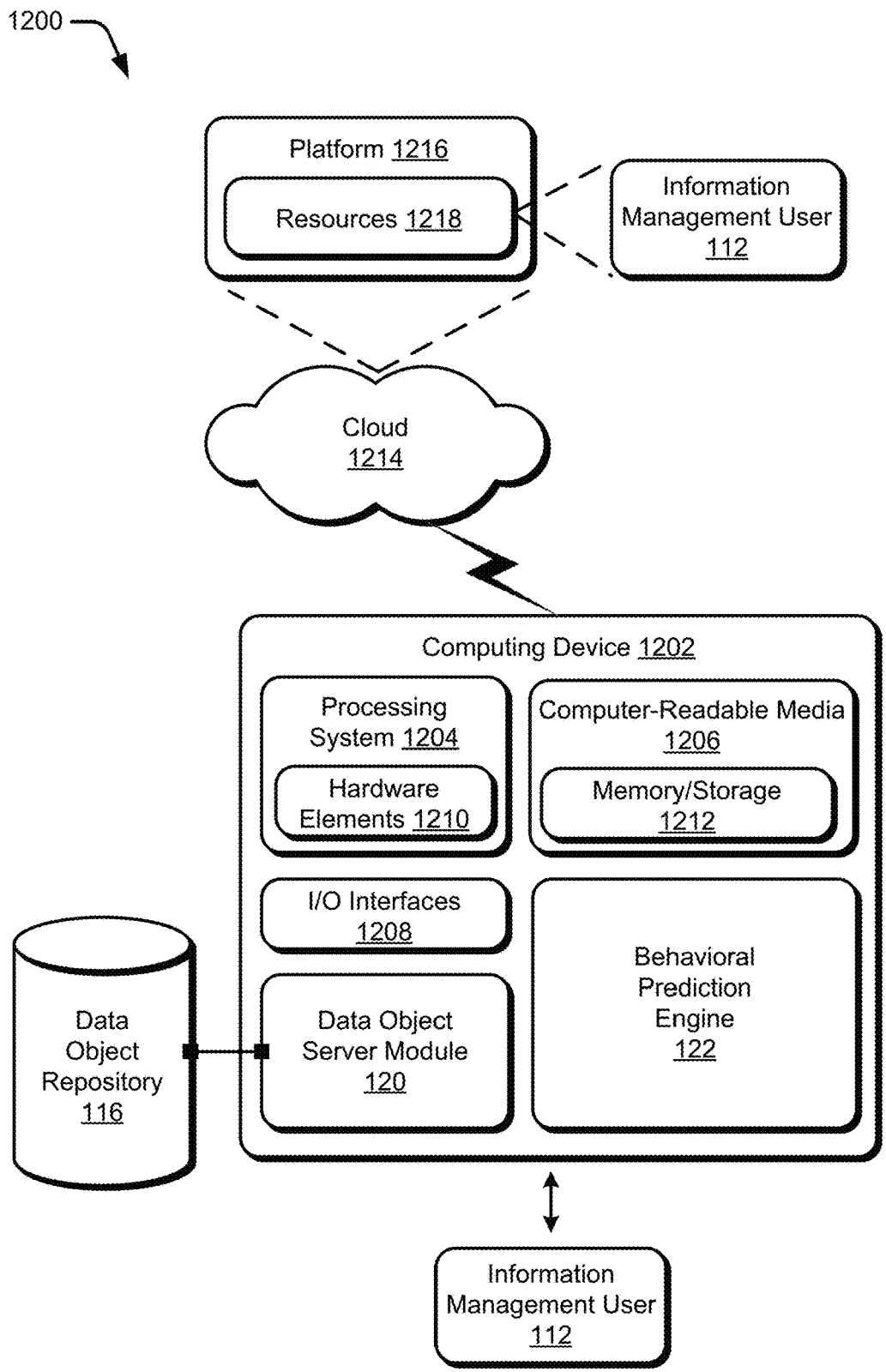
FIG. 12 illustrates an example system including various components of an example device that can be employed for one or more embodiments of behavioral prediction for targeted end users as described herein.

FIG. 12 illustrates an example system generally at 1200 that includes an example computing device 1202 that is representative of one or more computing systems or computing devices that may implement the various techniques described herein. This is illustrated through inclusion of a behavioral prediction engine 122, which may operate as described herein above, as well as a data object server module 120 and a data object repository 116. A computing device 1202 may be implemented as, for example, a server device 102 (of FIG. 1) of an information management user 112. Alternatively, although not explicitly shown in FIG. 12, a computing device 1202 may be implemented as, for example, an end-user device 104 (e.g., a client side device) of an end user 114 (both of which are shown in FIG. 1), an on-chip system or system-on-a-chip (SOC), or any other suitable computing device or computing system.

The example computing device 1202 as illustrated includes at least one processing system 1204, one or more computer-readable media 1206, and one or more I/O interfaces 1208 that may be communicatively coupled, one to another. Although not explicitly shown, the computing device 1202 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including one or more hardware elements 1210 that may be implemented as processors, functional blocks, and so forth. This may include implementation in hardware as an application specific integrated circuit (ASIC), a general-purpose processor, or other logic device formed using e.g. one or more semiconductors. The hardware elements 1210 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (e.g., random access memory (RAM)) or nonvolatile media (e.g., read only memory (ROM), flash memory, optical discs, or magnetic disks). The memory/storage component 1212 may include fixed media (e.g., RAM, ROM, or a fixed hard drive) or removable media (e.g., a flash memory card, a removable hard drive, or an optical disc). The computer-readable media 1206 may be implemented in a variety of other ways as further described below.

Input/output interface(s) 1208 are representative of functionality to allow a user to enter commands or information to computing device 1202 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors that are implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., an LCD or LED screen, a monitor, or a projector), a speaker, a printer, a network card, a haptic vibrating device, or a combination thereof. Thus, the computing device 1202 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," "engine," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1206 may include a variety of media that may be accessed by the computing device 1202. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, removable and non-removable media or storage devices implemented in a process or technology suitable for storage of information, such as computer readable instructions, data structures, program modules, logic elements/circuits, or other data. Examples of computer-readable storage media may include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible media, article of manufacture, or combination thereof that is suitable to store desired information and that may be accessed by a computer.

"Computer-readable signal media," as used herein, refers to a signal-bearing medium that is implemented to transmit instructions to hardware of the computing device 1202, such as via a network. Computer-readable signal media typically may embody computer readable instructions, data structures, program modules, or other data in a modulated data signal, such as carrier waves, data signals, or another transport mechanism. Computer-readable signal media may also include any information delivery media. The term "modulated data signal" means a signal that has one or more of its characteristics set or changed in such a manner as to encode information in the signal. By way of example, but not limitation, computer-readable signal media may include wired media, such as a wired network or direct-wired connection, or wireless media, such as acoustic, RF, microwave, infrared, or other wireless media.

As previously described, hardware elements 1210 and computer-readable media 1206 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1210. The computing device 1202 may be configured to implement particular instructions or functions corresponding to software or hardware modules. Accordingly, implementation of a module that is executable by the computing device 1202 as software may be achieved at least partially in hardware, e.g., through use of computer-readable storage media or the hardware elements 1210 of the processing system 1204. The instructions or functions may be executable/operable by one or more articles of manufacture (e.g., one or more computing devices 1202 or processing systems 1204) to implement techniques, modules, or examples described herein.

The techniques described herein may be supported by various configurations of the computing device 1202 and are not limited to the specific aspects of the example devices described herein. This functionality may also be implemented fully or partially through use of a distributed system, such as over a "cloud" 1214 via a platform 1216 as described below.

The cloud 1214 may include or represent a platform 1216 for resources 1218. The platform 1216 abstracts underlying functionality of hardware (e.g., one or more servers or at least one data center) and software resources of the cloud 1214. The resources 1218 may include applications or data that can be utilized while computer processing is at least partially executed on servers that are remote from, or distributed around, the computing device 1202. Resources 1218 may also include services provided over the Internet or through a subscriber network, such as a cellular or Wi-Fi network.

The platform 1216 may abstract resources and functions to connect the computing device 1202 with other computing devices or services. The platform 1216 may also serve to abstract a scaling of resources to provide a corresponding level of scale to encountered demand for the resources 1218 that are implemented via the platform 1216. Accordingly, in an interconnected device embodiment, implementation of functionality described herein may be distributed throughout the illustrated system of FIG. 12, or at least throughout the cloud 1214 along with the computing device 1202. For example, functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing device implemented to predict targeted end user behavior in a digital medium environment, the computing device comprising:
   a memory to maintain selectstream data indicative of data objects interaction by multiple end users in a computing environment, and the memory to maintain distinct classes that correspond to different behavioral traits of the multiple end users who are classified into one or more clusters based on the different behavioral traits derived from the selectstream data;
   a processor system to implement a behavioral prediction engine at least partially in hardware of the computing device, the behavioral prediction engine configured to:
   construct a directed graph based on the selectstream data corresponding to a new end user, the directed graph including one or more invariant features that translate to marketing analytics representative of the data objects interaction by the new end user in the computing environment;

determine isomorphic directed graphs based on a correlation between the directed graph of the new end user and directed graphs corresponding to one or more of the multiple end users, the isomorphic directed graphs including a same set of the one or more invariant features that represent the data objects interaction by the new end user and the one or more multiple end users in the computing environment;

predict a future behavior of the new end user using a machine learning system applied to the isomorphic directed graphs, the future behavior predicted based on the correlation of the isomorphic directed graphs as related to the distinct classes that correspond to different behavioral traits of the multiple end users, a directed opportunity tailored to the new end user based on the predicted future behavior of the new end user as derived from the selectstream data; and classify the new end user for membership into a selected cluster of the one or more clusters based on the different behavioral trait associated with the selected cluster as known from the multiple end users who are classified in the selected cluster.

2. The device as described in claim 1, wherein each isomorphic directed graph is representative of a path of travel as a corresponding end user traverses multiple ones of the data objects.

3. The device as described in claim 1, wherein the behavioral prediction engine includes a directed graph construction module configured to:

assign vertices of a given isomorphic directed graph based on the data objects interactions by a corresponding end user; and define respective directed edges of the given isomorphic directed graph based on respective pairs of source data objects and destination data objects that are traversed by the corresponding end user, the pairs of source data objects and destination data objects identified in the selectstream data of the corresponding end user.

4. The device as described in claim 1, wherein the one or more invariant features comprise at least one intuitive invariant feature that translates to a physical marketing concept and at least one abstract invariant feature that pertains to isomorphic directed graph topology.

5. The device as described in claim 1, wherein the behavioral prediction engine includes a graph feature vector computation module configured to compute multiple respective real values that correspond to multiple respective invariant features of the one or more invariant features for each isomorphic directed graph.

6. The device as described in claim 1, wherein the behavioral prediction engine includes a prediction model generation module configured to perform a clustering operation to separate multiple graph feature vectors into the one or more clusters based on one or more similarities between or among different ones of the multiple graph feature vectors.

7. The device as described in claim 1, wherein the behavioral prediction engine includes a prediction model generation module configured to perform a training operation on a classifier using multiple graph feature vectors as a training set of graph feature vectors associated with a classification category.

8. The device as described in claim 1, wherein the behavioral prediction engine is configured to apply a prediction model to a graph feature vector of an isomorphic directed graph that is derived from the selectstream data to determine the behavioral prediction of the future behavior for the new end user.

9. A system implemented to predict targeted end user behavior to facilitate opportunity tailoring in a digital medium environment, the system comprising:

one or more computing devices that implement a behavioral prediction engine at least partially in hardware, the behavioral prediction engine configured to generate a prediction model from an input of selectstream data performing operations comprising:

obtaining the selectstream data from one or more indications of data object requests corresponding to a targeted end user, the selectstream data indicative of the data object requests by the targeted end user in a computing environment;

constructing a directed graph based on the selectstream data, the directed graph including one or more invariant features that translate to marketing analytics reflective of the data object requests by the targeted end user in the computing environment;

determining isomorphic directed graphs based on a correlation between the directed graph of the targeted end user and directed graphs corresponding to one or more multiple end users, the isomorphic directed graphs including a same set of the one or more invariant features that represent the data object requests by the targeted end user and the one or more multiple end users in the computing environment;

predicting a future behavior of the targeted end user by applying the prediction model to correlate the isomorphic directed graphs based on different behavioral traits of the multiple end users, a directed opportunity tailored to the targeted end user based on the predicted future behavior of the targeted end user from the isomorphic directed graphs as derived from the selectstream data; and classifying the targeted end user in one or more classification categories, each associated with a particular behavioral attribute as determined from the multiple end users.

10. The system as described in claim 9, wherein the data object requests comprise requests for website pages that are each identified by a uniform resource locator (URL), and the obtaining comprises receiving the data object requests for the website pages from an end-user device of the targeted end user.

11. The system as described in claim 9, wherein the future behavior prediction comprises at least one of: an indication that the targeted end user is likely to make a purchase, an indication that the targeted end user is likely to join a customer associative program, or an indication that the targeted end user is likely to abandon an electronic cart without completing a purchase.

12. The system as described in claim 9, wherein the predicting the future behavior comprises:

identifying one or more graph feature vectors based on a similarity to a feature vector of the directed graph, the one or more graph feature vectors corresponding to one or more of the multiple end users that exhibited the particular behavioral attribute; and assigning to the future behavior prediction the particular behavioral attribute.

13. The system as described in claim 12, wherein a measure of the similarity comprises an L-p norm distance, and the identifying comprises determining the L-p norm distance between the feature vector of the directed graph and the one or more graph feature vectors.

14. The system as described in claim 9, wherein the predicting the future behavior comprises determining a relationship between the targeted end user and an individual segment of multiple segments, each segment of the multiple segments associated with the multiple end users that exhibited the particular behavioral attribute.

15. The system as described in claim 9, wherein the predicting the future behavior comprises assigning to the targeted end user a classification category of the one or more classification categories.

16. The system as described in claim 9, wherein the behavioral prediction engine performs operations comprising:
   determining the tailored opportunity responsive to the future behavior prediction; and
   issuing the tailored opportunity to the targeted end user.

17. The system as described in claim 16, wherein the tailored opportunity comprises a discount on a purchase of a product, and the issuing comprises presenting the discount to the targeted end user.

18. A method implemented to produce a behavioral prediction for a new end user as guidance for providing a tailored opportunity in a digital medium environment in which multiple end users interact with data objects in a computing environment, the method performed by a behavioral prediction engine implemented at least partially in hardware of a computing device, the method comprising:
   generating a prediction model based on data object interactions with the data objects by the multiple end users in the computing environment, and based on one or more behavioral attributes associated with the multiple end users as determined from isomorphic directed graphs that include a same set of one or more invariant features representing data object interactions by the new end user and the one or more multiple end users;
   determining marketing analytics reflective of the data object interactions by the new end user based on the one or more invariant features in a first isomorphic directed graph corresponding to the new end user;
   applying the prediction model to the isomorphic directed graphs for behavioral predictions of the new end user as determinable from a correlation of the first isomorphic directed graph as related to different behavioral traits of the multiple end users determined from at least a second isomorphic directed graph associated with the multiple end users; and
   determining a tailored opportunity for the new end user based on a predicted future behavior of the new end user from the isomorphic directed graphs as derived from the data object interactions.

19. The method as described in claim 18, further comprising:
   issuing the tailored opportunity for the new end user based on the behavioral predictions of the new end user.

20. The method as described in claim 18, wherein the applying the prediction model comprises determining the behavioral predictions based on a measure of similarity between the one or more invariant features that represent the data object interactions by the new end user and the one or more multiple end users in the computing environment.

* * * * *